(12) United States Patent
DuHack

(10) Patent No.: US 6,378,542 B1
(45) Date of Patent: Apr. 30, 2002

(54) FLOW CONTROL DEVICE HAVING A LIP SEAL AND COMPRESSIBLE BYPASS PADS AND ASSOCIATED METHOD FOR OPERATING AN APPLIANCE WATER VALVE

(75) Inventor: Michael R. DuHack, Indianapolis, IN (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/621,270

(22) Filed: Jul. 21, 2000

(51) Int. Cl.$^7$ ................................................. G05D 7/01
(52) U.S. Cl. ..................... 137/8; 137/512.4; 137/517; 137/859
(58) Field of Search ............................ 137/859, 513.3, 137/513.5, 513.7, 512.4, 8, 517, 504

(56) References Cited

U.S. PATENT DOCUMENTS

| | | | | |
|---|---|---|---|---|
| 2,960,109 A | * | 11/1960 | Wilson | 137/517 |
| 3,768,507 A | * | 10/1973 | Dicken | 137/517 |
| 5,154,394 A | | 10/1992 | DuHack | 251/120 |
| 5,899,224 A | * | 5/1999 | Moldenhauer | 137/517 |

* cited by examiner

Primary Examiner—Stephen M. Hepperle
(74) Attorney, Agent, or Firm—Maginot, Moore & Bowman

(57) ABSTRACT

A water valve assembly includes a valve component having defined therein a central cavity and a bypass channel. The water valve assembly also includes a flow control device positioned in the central cavity. The flow control device has defined therein a fluid passage and a sealing member secured to an outer periphery of the flow control device. The flow control device is positionable between a first pressure orientation and a second pressure orientation based on water pressure in the central cavity of the valve component. The sealing member is adapted to prevent advancement of water through the bypass channel when the flow control device is oriented in the first pressure orientation. The sealing member is adapted to allow advancement of water through the bypass channel when the flow control device is oriented in the second pressure orientation. A method of operating an appliance water valve assembly is also disclosed.

15 Claims, 19 Drawing Sheets

FLOW CONTROL DEVICE HAVING A LIP SEAL AND COMPRESSIBLE BYPASS PADS AND ASSOCIATED METHOD FOR OPERATING AN APPLIANCE WATER VALVE

CROSS REFERENCE

Cross reference is made to copending U.S. patent application Ser. No. 09/621,438, entitled "Snap-and-Crimp Appliance Water Valve Assembly and Associated Method for Making the Same" by Michael R. DuHack and Eugene A. Ritter, Jr. and Ser. No. 621,437, entitled "Integrated Filter and Noise Suppressor Device for a Water Valve Assembly and Associated Method for Operating the Same" by Michael R. DuHack, both of which are assigned to the same assignee as the present invention and both of which are filed concurrently herewith.

TECHNICAL FIELD OF THE INVENTION

The present invention relates generally to appliance water valves, and more particularly to a flow control device of an appliance valve which has a lip seal and compressible bypass pads and associated method of making an appliance water valve.

BACKGROUND OF THE INVENTION

Electrically operated water valves are commonly used in many household appliances such as refrigerator for providing a flow of water to appliance components such as icemakers and water dispensing units. Such appliance water valves are generally controlled by a controller associated with the appliance thereby providing a flow of water, at a predetermined flow rate, for use by the appliance.

Due to the highly competitive nature of the appliance industry, it has become increasingly necessary to reduce costs associated with manufacture of the appliances. As with any type of manufacturing, one way to reduce the cost associated with an article of manufacture is to reduce the cost of the components from which the article of manufacture is constructed. Hence, in the particular case of the appliance industry, one way of reducing the cost associated with the manufacture of a given appliance is to reduce the cost of the components from which the appliance is constructed.

Accordingly, it has become increasingly necessary to reduce the cost of, for example, the water valve which is assembled into a refrigerator. Several problems exist with current assembly methods for appliance water valves which tend to increase costs associated with the valve. For example, heretofore designed water valves are assembled by use of weldments and fasteners such as screws. The manufacturing processes associated with the use of weldments and fasteners are often difficult to control and monitor thereby increasing costs associated with manufacture of the water valve. In particular, the use of fasteners has heretofore been difficult and expensive to automate thereby necessitating a labor intensive manual assembly process for installing the fasteners. Moreover, weldments have typically undesirably required relatively tight tolerances in both component design and assembly techniques thereby necessitating that use of relatively expensive manufacturing techniques to work with such tight tolerances.

In addition to reducing costs associated with the water valve, there also exists an increasing need to increase performance of the water valve. In particular, it is becoming increasingly important for appliance water valves to be capable of providing for a relatively constant flow rate across a broader inlet water pressure range. In particular, heretofore designed elastomeric flow control devices have typically been unable to produce a constant flow rate a relatively low inlet water pressures (e.g. 10–20 psi). As a result of this, certain flow control devices have been designed with features which provide for a bypass flow of water around the flow control device. While these attempts have produced somewhat favorable results at low pressures, the bypass flow of water around the flow control device also exists at high water pressures thereby undesirably providing for a flow rate at high water pressures which exceeds the desired flow rate.

What is needed therefore is an appliance water valve which overcomes one or more of the above-mentioned drawbacks. What is particularly needed is an appliance water valve which is relatively easy to assemble and does not require the use of weldments or fasteners. What is also particularly needed is an appliance water valve which provides for a substantially constant flow rate at relatively low inlet water pressures.

SUMMARY OF THE INVENTION

In accordance with one embodiment of the present invention, there is provided a water valve assembly. The water valve assembly includes a valve component having defined therein a central cavity and a bypass channel. The water valve assembly also includes a flow control device positioned in the central cavity. The flow control device has defined therein a fluid passage and a sealing member secured to an outer periphery of the flow control device. The flow control device is positionable between a first pressure orientation and a second pressure orientation based on water pressure in the central cavity of the valve component. The sealing member is adapted to prevent advancement of water through the bypass channel when the flow control device is oriented in the first pressure orientation. The sealing member is adapted to allow advancement of water through the bypass channel when the flow control device is oriented in the second pressure orientation.

In accordance with another embodiment of the present invention, there is provided a method of operating a water valve assembly which includes (i) a valve component having defined therein a central cavity and a bypass channel, and (ii) a flow control device positioned in the central cavity. The flow control device has defined therein a fluid passage and a sealing member secured to an outer periphery of the flow control device. The method includes the step of advancing water through the central cavity of the valve component at a first water pressure level. The method also includes the step of orienting the flow control device in a first pressure orientation such that the sealing member prevents advancement of water through the bypass channel in response to advancement of water through the central cavity of the valve component at the first water pressure level. The method further includes the step of advancing water through the central cavity of the valve component at a second water pressure level. Yet further, the method includes the step of orienting the flow control device in a second pressure orientation such that the sealing member allows advancement of water through the bypass channel in response to advancement of water through the central cavity of the valve component at the second water pressure level.

In accordance with a further embodiment of the present invention, there is provided a flow control device for use in a water valve assembly. The flow control device includes a body having a first face and a second face. The flow control device also includes a sealing lip secured around a periphery of the first face of the body. The flow control device further includes a bypass pad extending from the first face of the body.

It is therefore an object of the present invention to provide a new and useful appliance water valve.

It is moreover an object of the present invention to provide an improved appliance water valve.

It is a further object of the present invention to provide a new and useful method of making an appliance water valve.

It is also an object of the present invention to provide an improved method of making an appliance water valve.

It is also an object of the present invention to provide a new and useful method of operating an appliance water valve.

It is yet further an object of the present invention to provide an improved method of operating an appliance water valve.

It is moreover an object of the present invention to provide an appliance water valve that is easy to assemble and utilizes relatively inexpensive components.

It is also an object of the present invention to provide an appliance water valve that provides for a substantially constant flow rate at relatively low inlet water pressures.

The above and other objects, features, and advantages of the present invention will become apparent from the following description and the attached drawings.

DETAILED DESCRIPTION OF THE INVENTION

Figure 1:
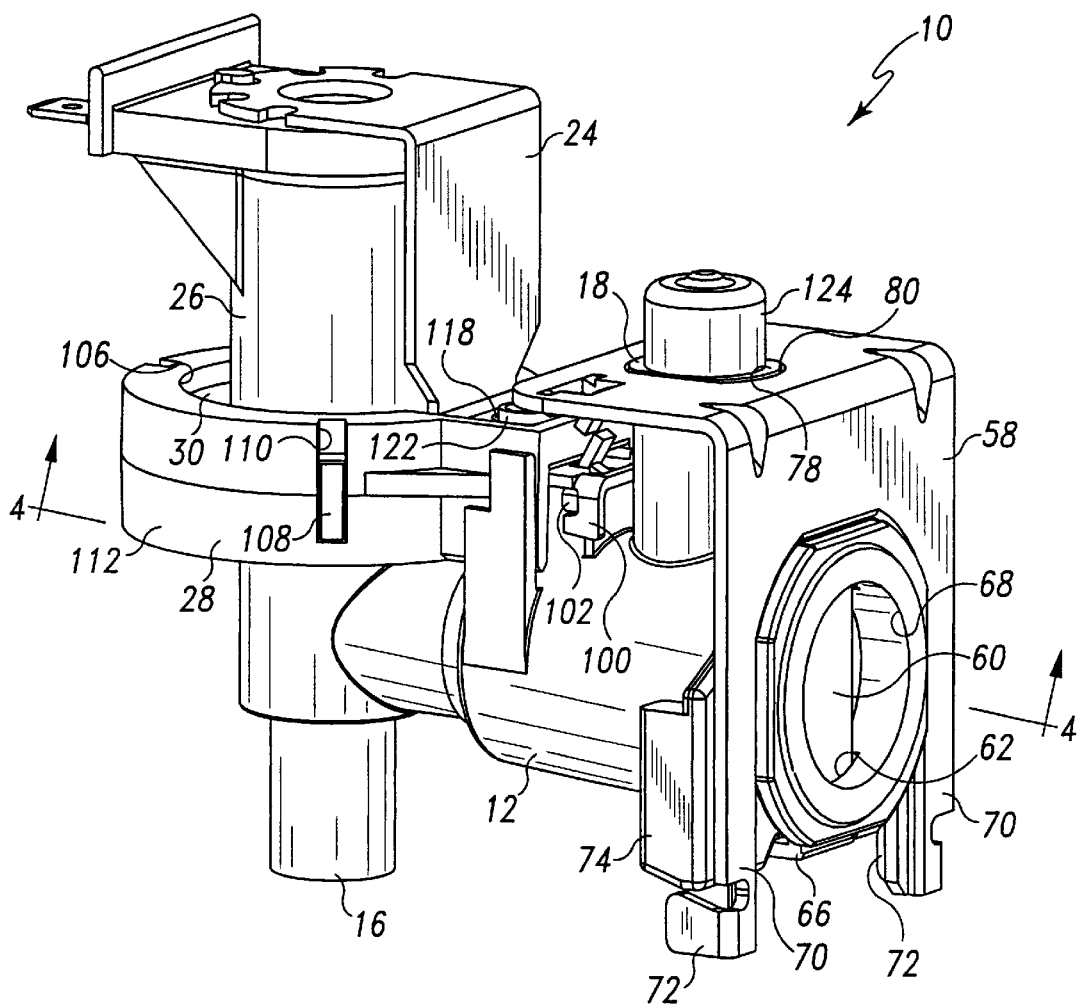
FIGS. 1 and 2 are perspective views of an appliance water valve assembly which incorporates the features of the present invention therein.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIGS. 1–4, there is shown an appliance water valve assembly 10. The water valve assembly 10 includes a valve body 12 which has a fluid opening 14 (see FIGS. 3, 4, and 6) and a water outlet 16 defined therein. Secured to the valve body 12 is a fitting 18 having a water inlet 20 defined therein. Hence, water is selectively advanced from the water inlet 20, through a central cavity 42 defined in the valve body 12, and out the water outlet 16.

The fitting 18 is typically connected to a residential water line (not shown) thereby providing for a water flow to the water inlet 20. The outlet 16, on the other hand, is typically a tube-type connector which is connected to a fill line of an appliance component (not shown) such as an icemaker or water dispensing unit associated with a refrigerator.

The water valve assembly 10 further includes a valve actuator assembly 22 having an upper pole plate frame 24, a solenoid coil 26, a retainer 28, a lower pole plate frame 30, a guide tube 32, and an armature 34. The valve actuator assembly 22 is provided to selectively allow for the advancement of a flow of water out the water outlet 16. In particular, the armature 34 is disposed in the guide tube 32 and is biased against a valving surface 36 (see also FIG. 6) by a spring 38 thereby urging a seal insert 40 associated with the armature 34 against a valving surface 36. The seal insert 40 is made of a flexible material, such as ethylene propylene (EP) rubber thereby providing desirable sealing characteristics when biased against the valving surface 36.

Hence, when the valve actuator assembly 22 is in a closed position, such as shown in FIG. 1, the seal insert 40 of the armature 34 is biased against the valving surface 36 thereby preventing water from flowing out of the central cavity 42 and through the water outlet 16. However, when the valve actuator assembly 22 is moved to an open position, i.e. a position in which the seal insert 40 of the armature 34 is spaced apart from the valving surface 36, water is permitted to flow out of the central cavity 42 and through the water outlet 16 thereby providing for a flow of water out of the water outlet 16 and into the fill line of the appliance component.

It should be appreciated that the solenoid coil 26 is selectively actuated to position the valve actuator assembly 22 in its open position. In particular, actuation of the solenoid coil 26 by the controller of the appliance (not shown) generates a magnetic field which urges the armature 34 upwardly (as viewed in FIG. 4) thereby positioning the valve actuator assembly 22 in its open position in which water is advanced out of the water outlet 16. Deactuation of the solenoid coil 26 by the appliance controller removes the magnetic field thereby allowing the spring bias generated by the spring 38 to urge the armature downwardly (as viewed in FIG. 4) such that the seal insert 40 is seated on the valving surface 36.

Figure 3:
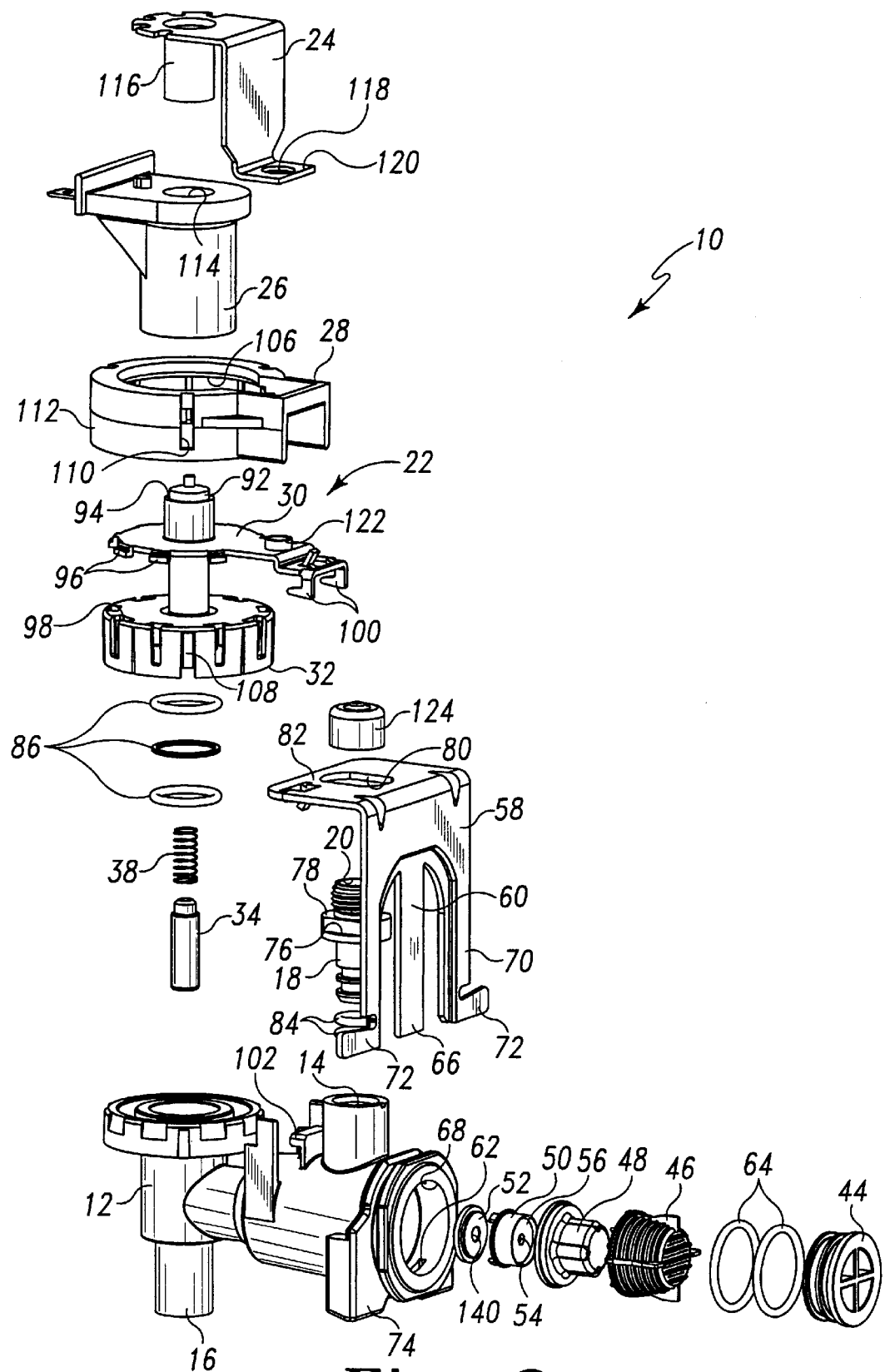
FIG. 3 is an exploded perspective view of the water valve assembly of FIGS. 1 and 2.
Figure 4:
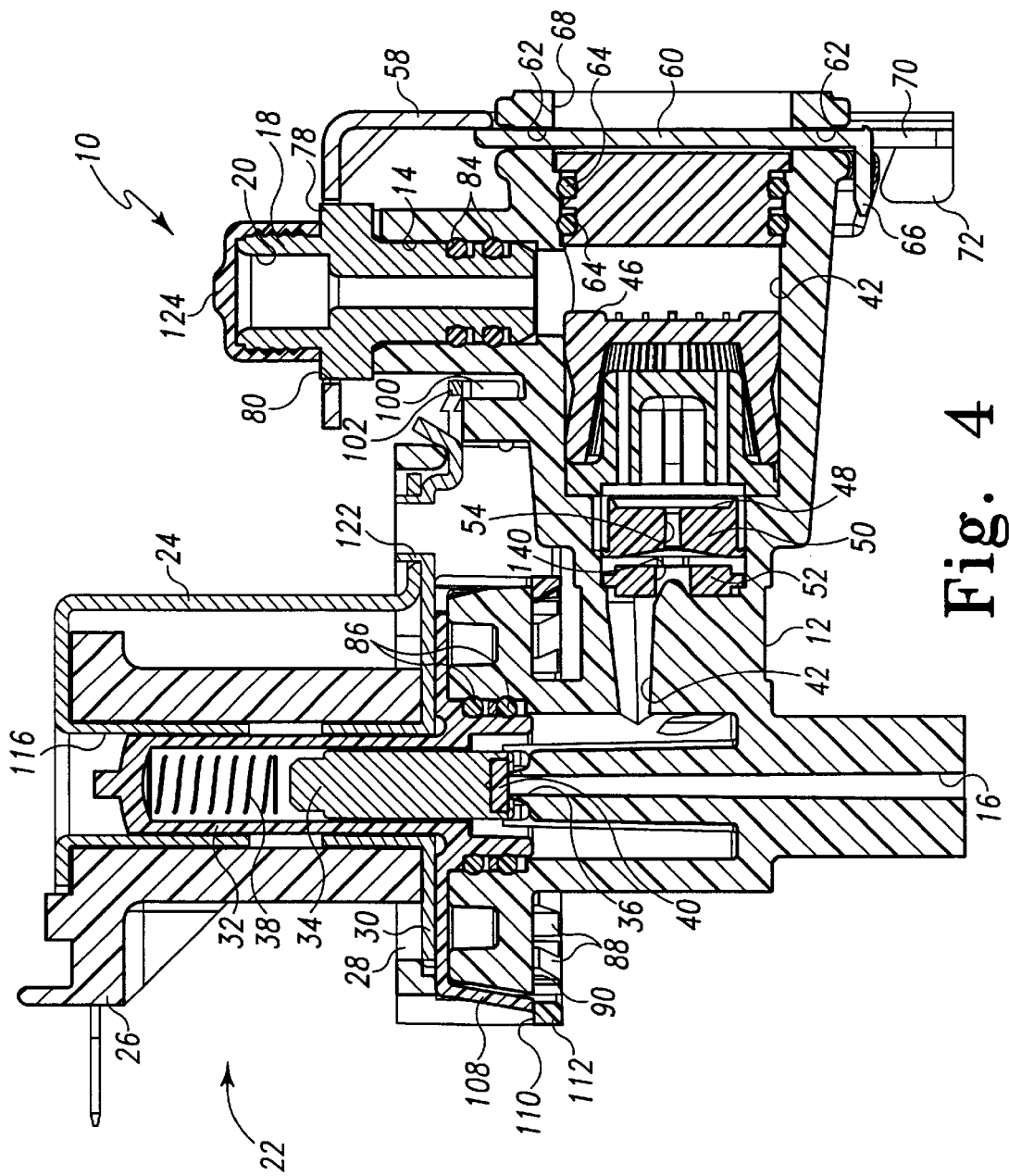
FIG. 4 is a cross sectional view taken along the line 4—4 of FIG. 1, as viewed in the direction of the arrows.
Figure 5:
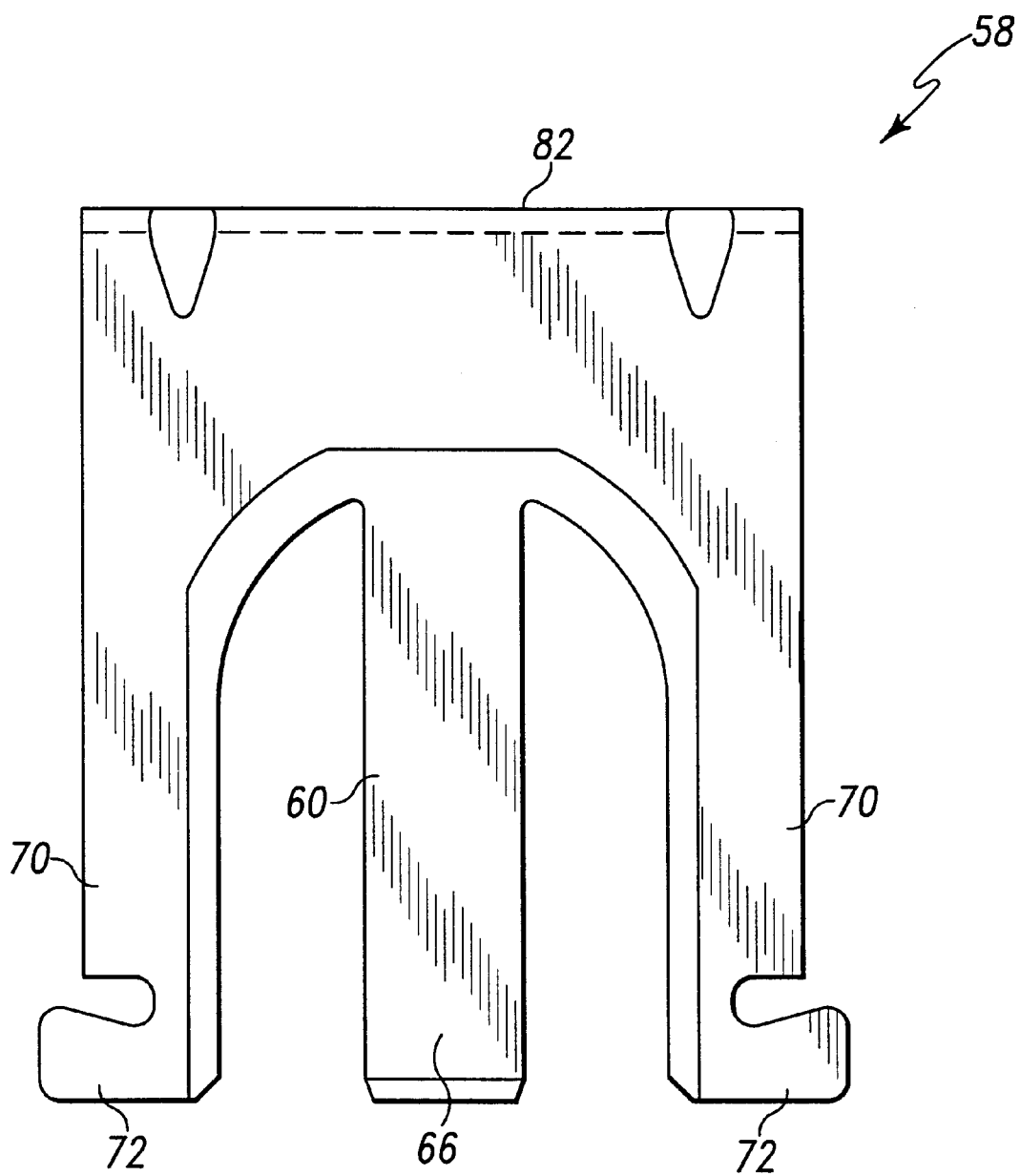
FIG. 5 is an elevational view of the mounting bracket of the water valve assembly of FIGS. 1 and 2.

As shown in FIGS. 3 and 4, the water valve assembly 10 also includes a number of valve components which are positioned within the central cavity 42 proximate to the water inlet 20. In particular, the water valve assembly 10 also includes an end cap 44, a filter screen 46, a noise suppressor 48, a flow control device 50, and a washer 52. The filter screen 46 inhibits debris particles, which may be contained in the incoming residential water flow, from reaching the noise suppressor 48, the flow control device 50, the valve actuator assembly 22, or other components associated with the water valve assembly 10.

The flow control device 50 is made of flexible material such as ethylene propylene (EP) rubber, and has a central passage 54 defined therein. The flow control device 50 flexes or deforms in response to variations in inlet water pressure exerted on an upstream surface or face 56 thereof. In particular, a higher inlet water pressure on the upstream face 56 causes a greater amount of flexing or deformity of the flow control device 50 thereby reducing the diameter of the central passage 54. A lower inlet water pressure exerted on the upstream face 56 causes the flexing or deformity of the flow control to be reduced thereby enlarging, or even maximizing, the diameter of the central passage 54. As shall be discussed below in greater detail, the flow control device 50 provides for a relatively constant flow rate of water across a relatively broad range of inlet water pressures including relatively low inlet water pressures in the range of less than 20 psi.

The washer 52 has a washer orifice 140 defined therein and provides a surface on which the flow control device 50 is supported. The washer 52 is typically made of a rigid material such as plastic or stainless steel.

The noise suppressor 48 is provided to reduce the amount of cavitation, and hence the amount of noise, generated by the flow of water being advanced through the appliance water valve assembly 10. The noise suppressor 48 is made from a plastic material, such as polypropylene.

Figure 2:
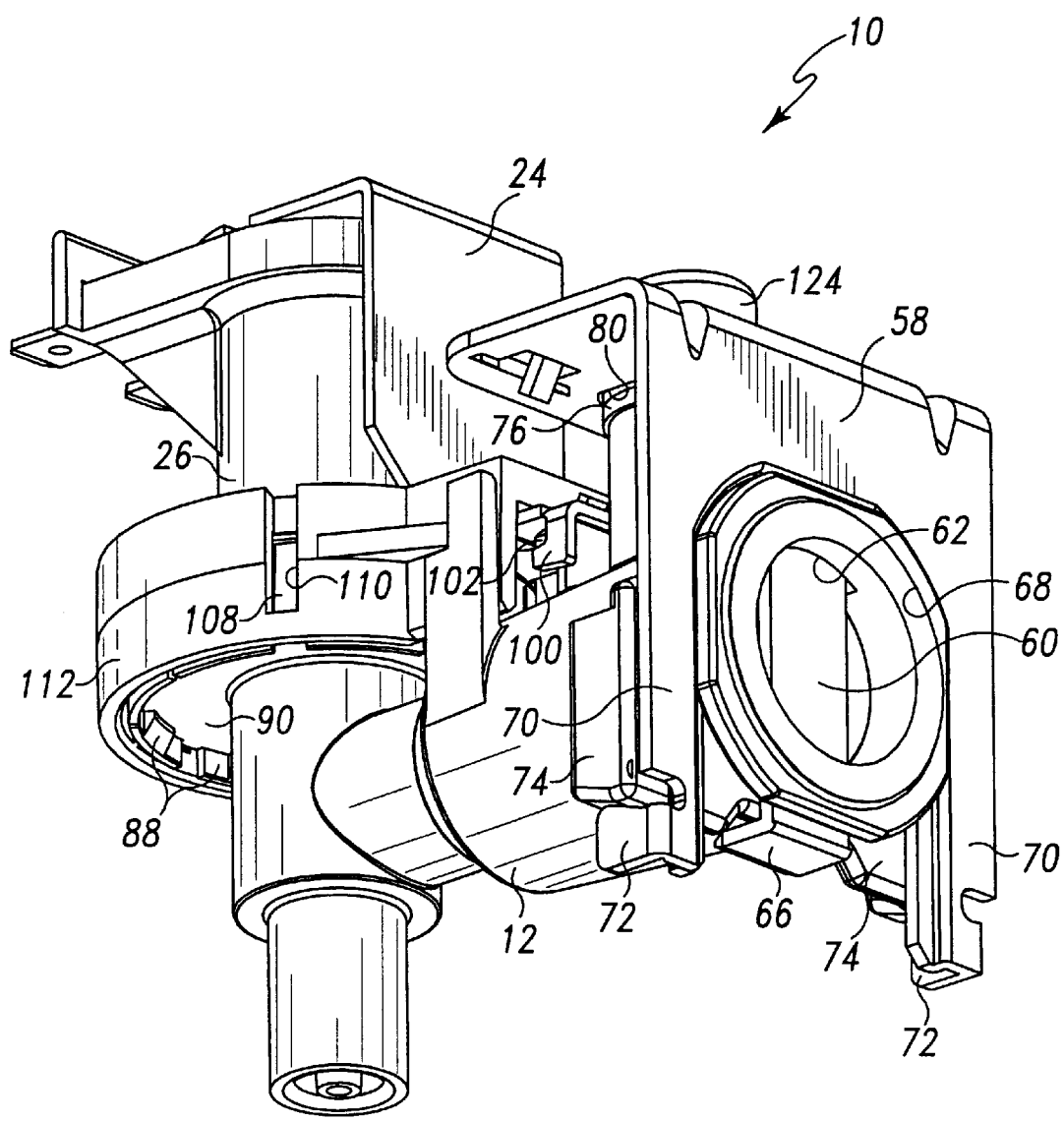

As shown in FIGS. 1–4, the water valve assembly 10 also includes a retaining bracket 58. The retaining bracket 58 is generally constructed of metal and is provided to retain the valve components 44, 46, 48, 50, and 52, along with a pair of O-ring seals 64, within the central cavity 42 of the valve body 12 once the components and the O-ring seals have been advanced through a component access opening 68 defined in the valve body 12. In particular, the retaining bracket 58 has a flange 60 defined therein which is advanced through a pair of bracket-receiving openings such as bracket-receiving slots 62 defined in the valve body 12. Once advanced through the bracket-receiving slots 62, a distal end portion 66 of the flange 60 is crimped, bent, or otherwise formed in order to prevent the flange 60 from being removed from the bracket-receiving slots 62. As shown in FIGS. 1, 2, and 4, the distal end portion 66 of the flange 60 is preferably crimped into a substantially L-shaped configuration in order to prevent the flange 60 from being removed from the bracket-receiving slots 62. Hence, when retained by the retaining bracket 58, the end cap 44, along with its associated 0-rings 64, sealingly engages the valve body 12 so as to prevent water from advancing out of the component access opening 68.

When installed in such a manner, the flange 60 retains the end cap 44 (and hence the filter screen 46, the noise suppressor 48, the flow control device 50, and the washer 52) in the central cavity 42 of the valve body 12. It should be appreciated that the flange 60 may retain the end cap by actually contacting the end cap 44, or may retain the end cap 44 by being slightly spaced apart from the end cap 44, but preventing the end cap 44 from moving beyond the predetermined distance from which it is separated from the flange 60.

As shown in FIGS. 3 and 4, the retaining bracket 58 also has a pair of locking tabs 70 defined therein. The locking tabs 70 function to facilitate retention of retaining bracket 58 to the valve body 12. In particular, as shown in FIGS. 1–2 and 4, once the flange 60 has been advanced through the bracket-receiving slots 62, a distal end portion 72 of the locking tabs 70 is crimped, bent, or otherwise formed in order to prevent the flange 60 from being removed from the bracket-receiving slots 62. As shown in FIGS. 1–2 and 4, the distal end portion 72 of each of the locking tabs 70 is preferably crimped in the general direction of the outlet 16 so as to assume a substantially L-shaped configuration thereby contacting a retaining shoulder 74 defined in the valve body 12. It should be appreciated that such contact with the retaining shoulders 74 by the locking tabs 70 prevents the flange 60 from being removed from the bracket-receiving slots 62.

It should be appreciated that the respective end portions 66, 72 of the flange 60 and the locking tabs 70 may be crimped in any one of numerous manners. Preferably, the respective end portions 66, 72 of the flange 60 and the locking tabs 70 are simultaneously crimped by a single die or other type of forming tool during manufacture of the water valve assembly 10.

The retaining bracket 58 also functions to retain the fitting 18, along with an associated number of sealing rings 84, in the fluid opening 14. In particular, as shown in FIG. 3, the fitting 18 has defined therein a substantially flat flange 76 which surrounds a double-D shaped protrusion 78. When the retaining bracket 58 is secured to the valve body 12, the double-D shaped protrusion 78 is received through a corresponding double-D shaped opening 80 defined in the retaining bracket 58. As the retaining bracket 58 is advanced downwardly (as viewed in FIG. 3), an upper flange 82 thereof contacts the flange 76 of the fitting 18 thereby urging the fitting 18 downwardly so as to retain the fitting 18 in the fluid opening 14. Once the fitting 18 has been secured to the valve body 12 in such a manner, a disposable fitting cap 124 may be installed onto the threads of the inlet fitting 18 in order to protect the threads of the fitting 18 during shipment or other handling of the water valve assembly 10.

Hence as described herein, each of the inlet valve components 44, 46, 48, 50, and 52, the inlet fitting 18, and the associated seals 64, 84 are retained in the valve body 12 by the retaining bracket 58. Such a configuration provides numerous advantages to the water valve assembly 10 of the present invention. For example, use of the retaining bracket 58 eliminates the need for fasteners such as bolts or weldments in the assembly of this portion of water valve assembly 10. Such elimination of fasteners and weldments simplifies the manufacturing process associated with construction of the water valve assembly 10 since the retaining bracket 58 may be secured to the valve body 12 by a relatively simple crimping technique as described above. Moreover, such elimination of fasteners also reduces the component count associated with the water valve assembly 10 thereby further reducing costs associated therewith.

The valve actuator assembly 22 of the water valve assembly 10 may also be assembled without the use of fasteners or weldments. In particular, the armature 34 and the biasing spring 38 are first inserted into the guide tube 32. Thereafter, the guide tube 32 is snapped onto the valve body 12. In particular, the lower portion of the guide tube 32 has a number of cantilevered snaps 88 defined therein (see FIGS. 2 and 4). The snaps 88 engage a bottom surface 90 of the valve body 12 so as to secure the guide tube 32 to the valve body 12. It should be appreciated that a number of washers and O-rings 86 may be utilized to seal the guide tube 32 to the valve body 12.

Once the guide tube 32 has been secured to the valve body 12 (with the armature 34, the washers and O-rings 86, and the biasing spring 38 captured therein), the lower pole plate frame 30 is lowered onto the guide tube 32. In particular, a tube portion 92 of the guide tube 32 is received through a tube opening 94 defined in the lower pole plate frame 30 such that a number of locating tabs 96 defined in the lower pole plate frame 30 may be positioned in a corresponding number of locating slots 98 defined in an upper surface of the guide tube 32. In order to secure the lower pole plate frame 30 to the valve body 12, a pair of L-shaped locking tabs 100 defined in the lower pole plate frame 30 are folded inwardly toward one another so as to be captured by an inverted L-shaped member 102 defined in the valve body 12. It should be appreciated that the locking tabs 100 may be simultaneously folded or otherwise formed by a single die or other forming tool.

Once the lower pole plate frame 30 has been secured to the valve body 12, the retainer 28 is then lowered onto the lower pole plate frame 30 and the guide tube 32. In particular, the tube portion 92 of the guide tube 32 and the upper portion of the lower pole plate frame 30 is received through a retainer opening 106 defined in the retainer 28. The retainer 28 is secured to the guide tube 32 by use of a number of locking tabs 108 which are defined in the guide tube 32 and are received through a corresponding number of openings 110 defined in the retainer 28 (see FIGS. 2 and 4). It should be appreciated that when secured to the guide tube 32 in the manner described above, a downwardly extending skirt portion 112 of the retainer 28 functions to keep the cantilevered locking tabs 88 of the guide tube 32 from being inadvertently disengaged from the bottom surface 90 of the valve body 12.

The solenoid coil 26 is then lowered onto the partially assembly water valve assembly 10. In particular, the tube portion 92 of the guide tube 32 and the upper portion of the lower pole plate frame 30 is received through a solenoid opening 114 defined in the solenoid coil 26.

The solenoid coil 26 is secured to the water valve assembly 10 by the upper pole plate frame 24. In particular, a downwardly extending, cylindrically shaped pole portion 116 of the upper pole plate frame 24 is received into the solenoid opening 114 of the solenoid coil 26. At the same time, a locking opening 118 defined in a lower flange 120 of the upper pole plate frame 24 is received around an upwardly extending, cylindrically shaped protrusion 122 defined in the lower pole plate frame 30 (see FIGS. 3 and 4). The upper wall portion of the protrusion 122 is then swaged or otherwise deformed so as to capture the lower flange 120 of the upper pole plate frame 24 thereby securing the upper pole plate frame 24 and hence the solenoid coil 26 to the water valve assembly 10.

Hence, as described above, it should be appreciated that the valve actuator assembly 22 may be assembled without the use of fasteners or weldments thereby facilitating ease of assembly of the water valve assembly 10. As described above, such elimination of fasteners and weldments simplifies the manufacturing process associated with construction of the water valve assembly 10 by, amongst other things, providing for enhanced automation of the assembly process thereby reducing, if not eliminating, the need for more expensive manual assembly techniques.

Figure 8:
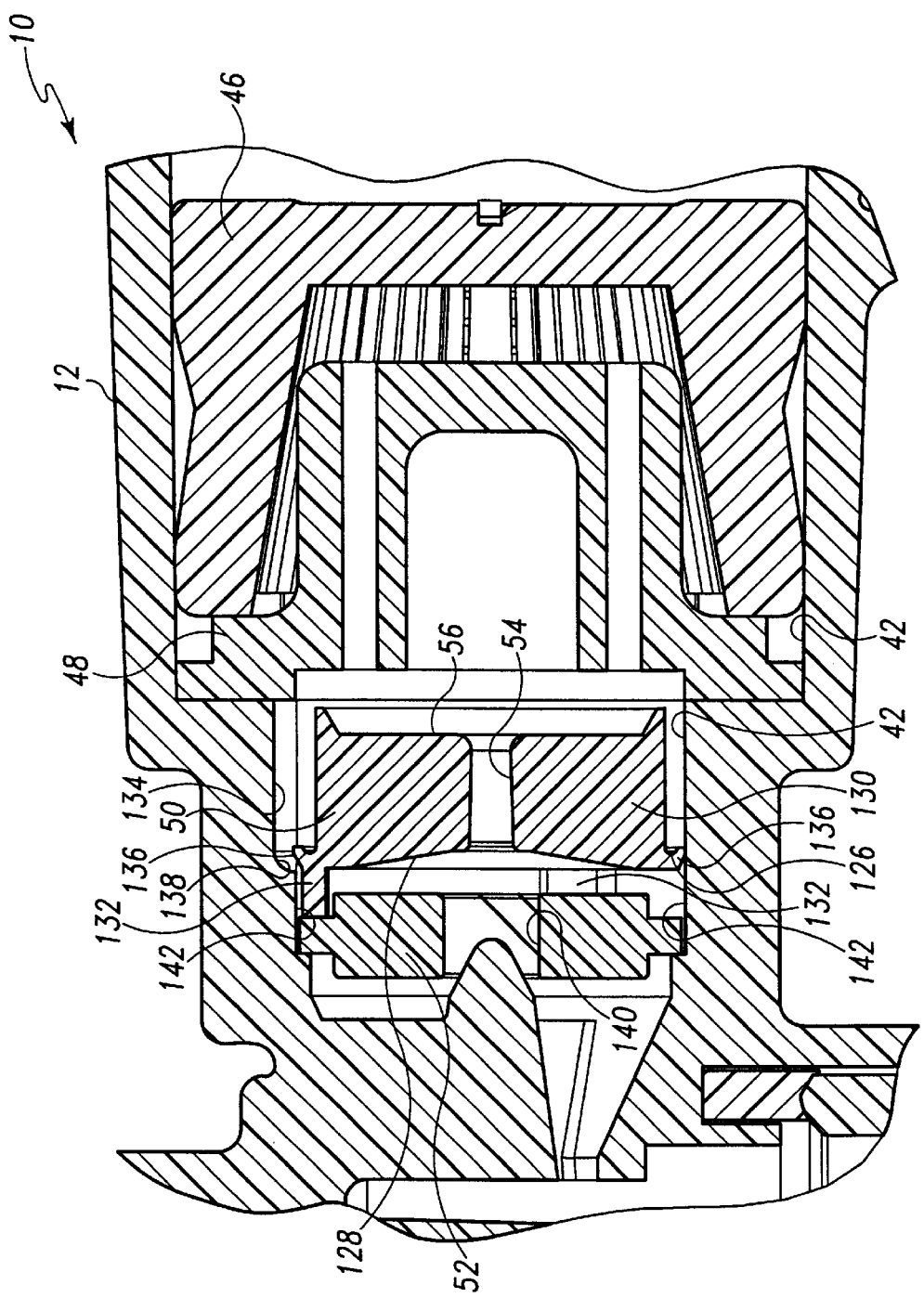
FIG. 8 is an enlarged view of the inlet portion of the water valve assembly of FIG. 4.
Figure 9:
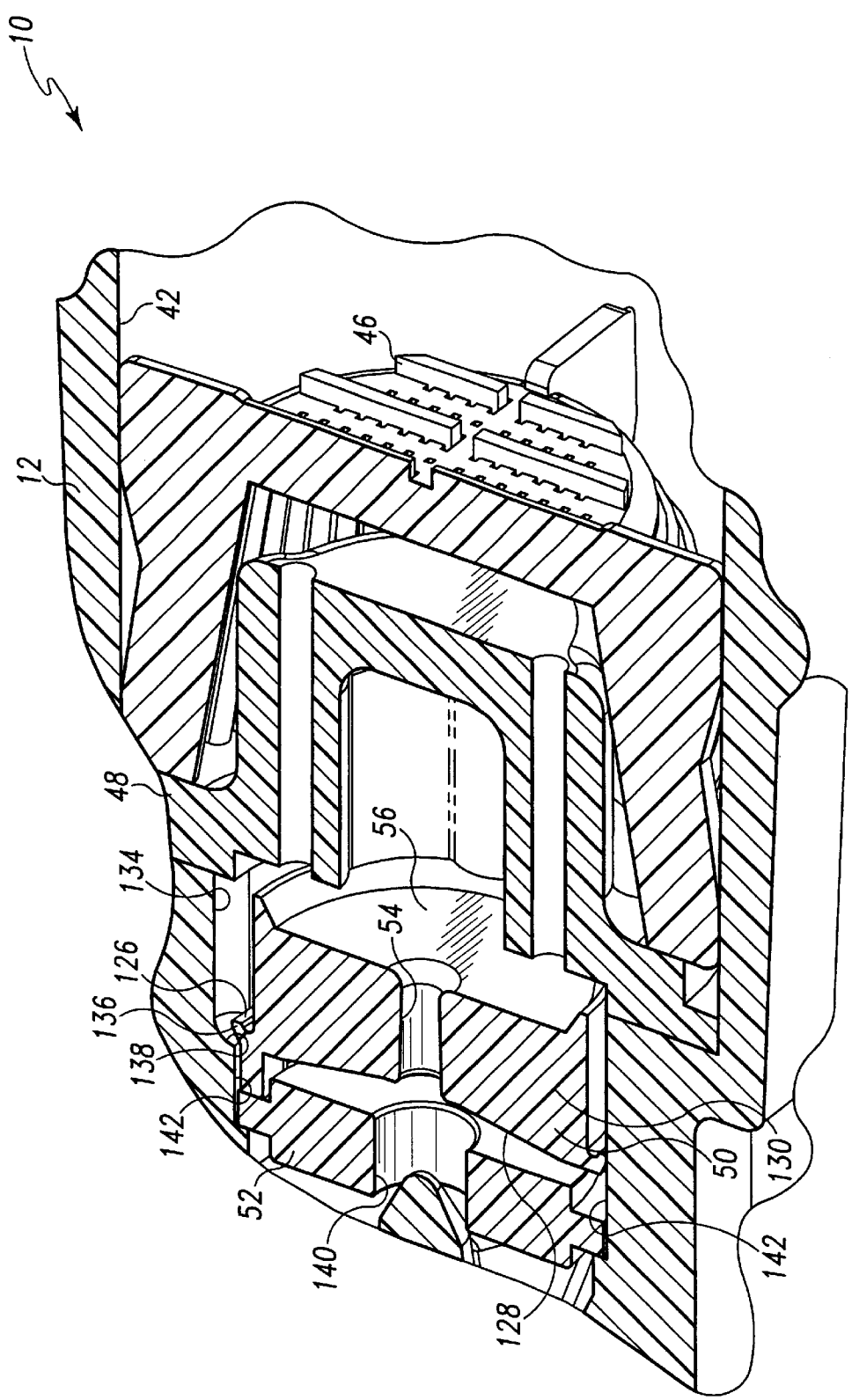
FIG. 9 is a view similar to FIG. 8, but showing the inlet portion in a perspective cross sectional view.

Referring now to FIGS. 8 and 9, the inlet portion of the water valve assembly 10 is shown in greater detail. As described above, the flow control device 50 provides for a relatively constant flow rate of water through the water valve assembly 10 across a relatively broad range of inlet water pressures. In particular, as shall now be described in greater detail, the flow control device 50 of the present invention selectively provides for a bypass flow of water around the periphery of the flow control device 50 at relatively low water pressures, but prevents such a bypass flow of water around the periphery of the flow control device 50 at higher water pressures.

Figure 10:
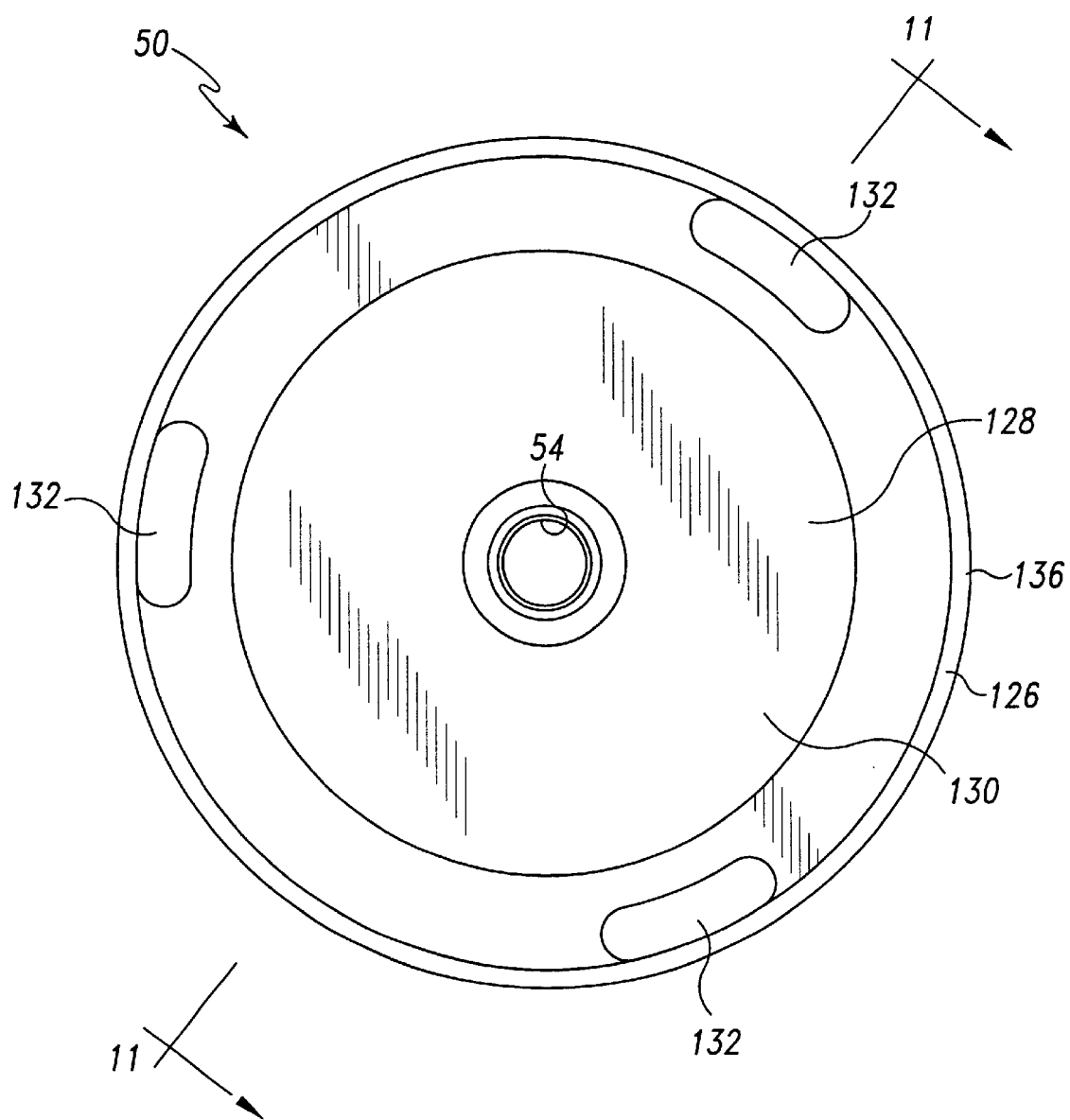
FIG. 10 is an enlarged plan view of the flow control device of the water valve assembly of FIGS. 8 and 9.
Figure 11:
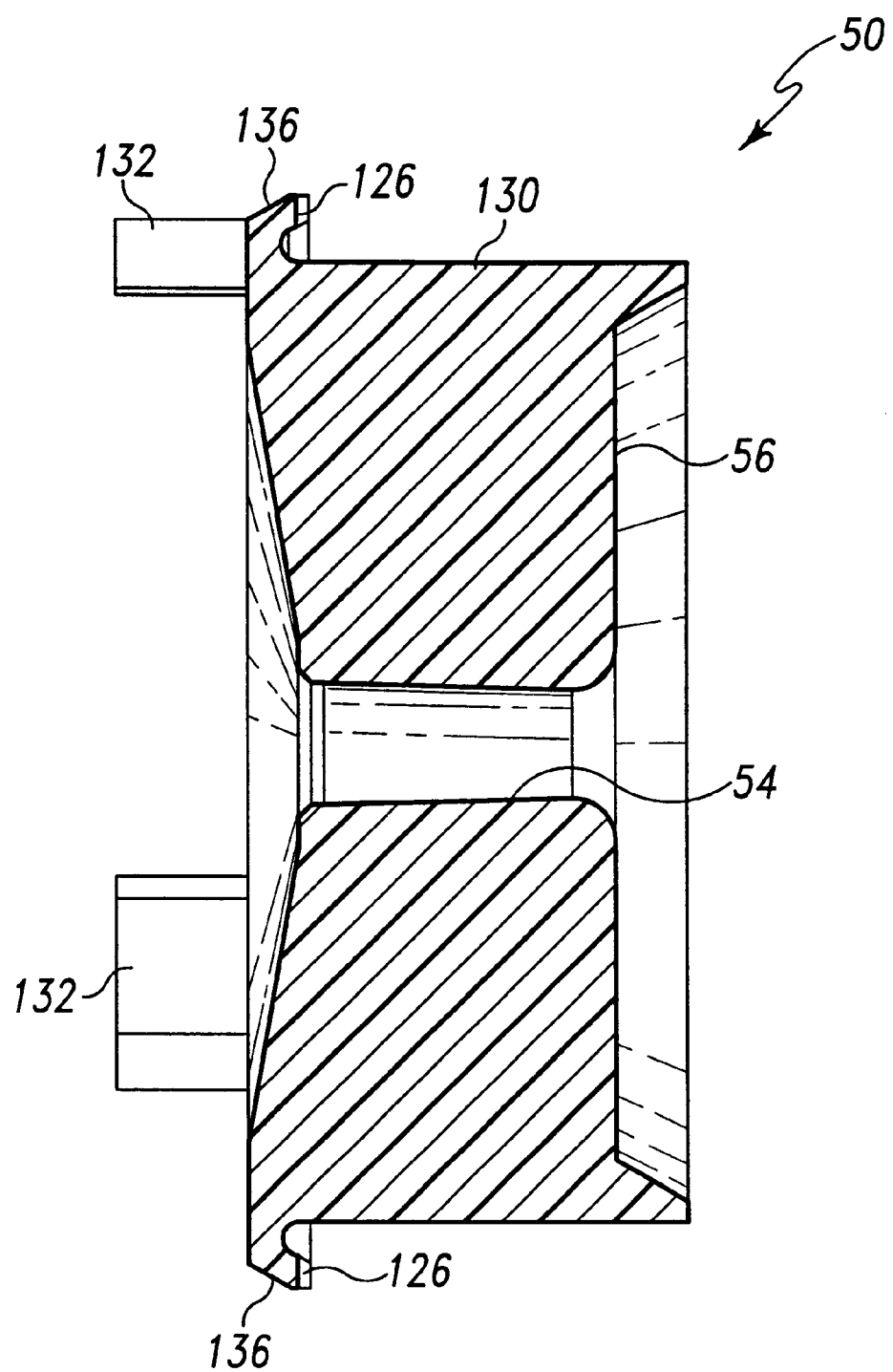
FIG. 11 is a cross sectional view of the flow control device taken along the line 11—11, as viewed in the direction of the arrows.

As shown in FIGS. 10 and 11, the flow control device 50 is substantially disk shaped and includes a body 130 having the central passage 54 extending therethrough. As shown in FIG. 11, the body 130 of the flow control device 50 has defined therein the upstream face 56 and a downstream surface or face 128. A sealing member such as a sealing lip 126 is integrally formed or otherwise secured around the periphery of the downstream face 128 of the body 130. The flow control device 50 also has defined therein a number of bypass pads 132 which extend outwardly from the downstream face 128 of the body 130. Although the flow control device 50 is herein described and shown in the drawings to include three bypass pads 132, it should be appreciated that both the size and number of bypass pads 132 included in a particular design of the flow control device 50 may be altered to fit the needs of a given design of the water valve assembly 10.

Figure 6:
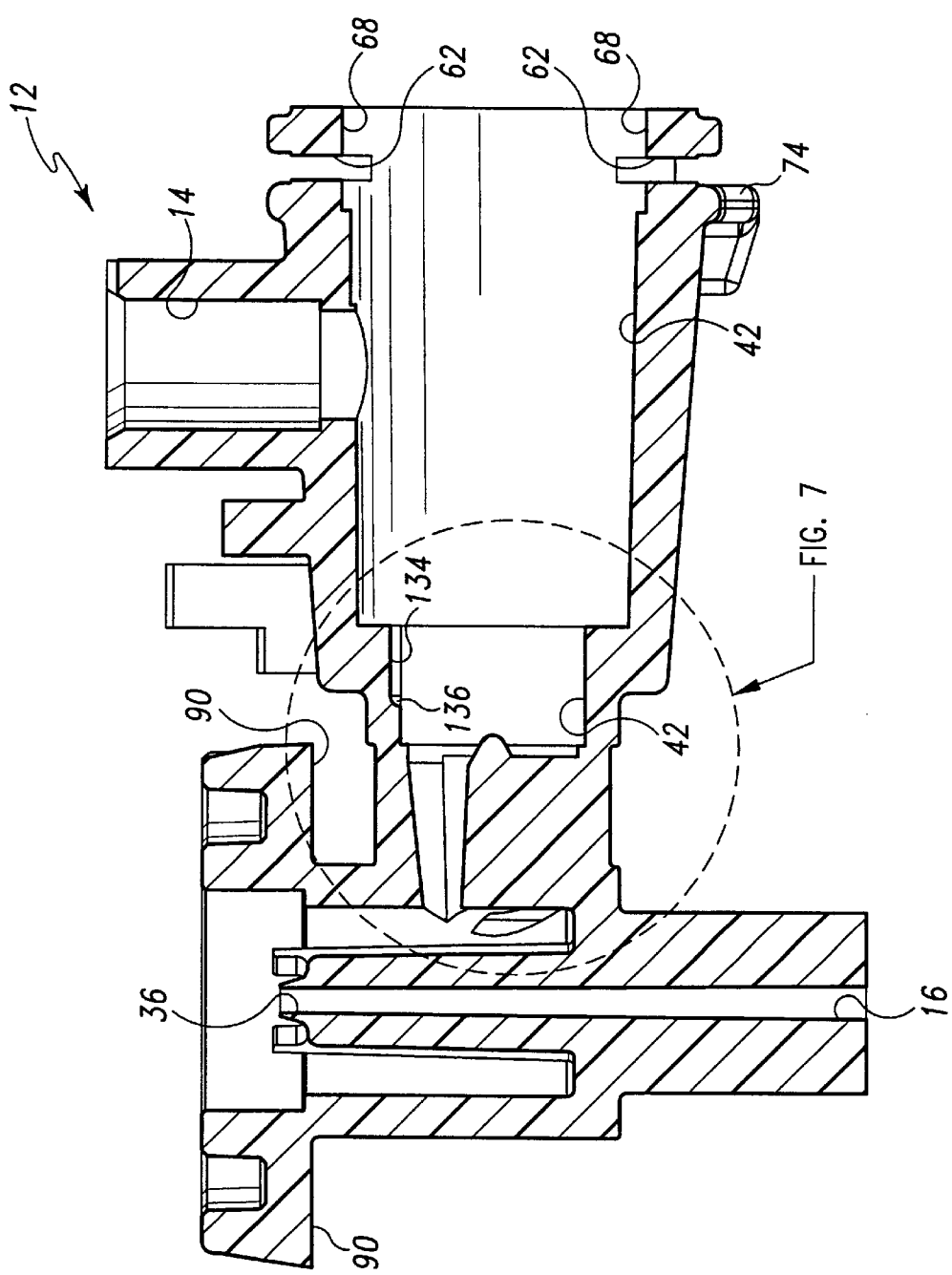
FIG. 6 is a cross sectional view of the valve body of FIGS. 1 and 2.
Figure 7:
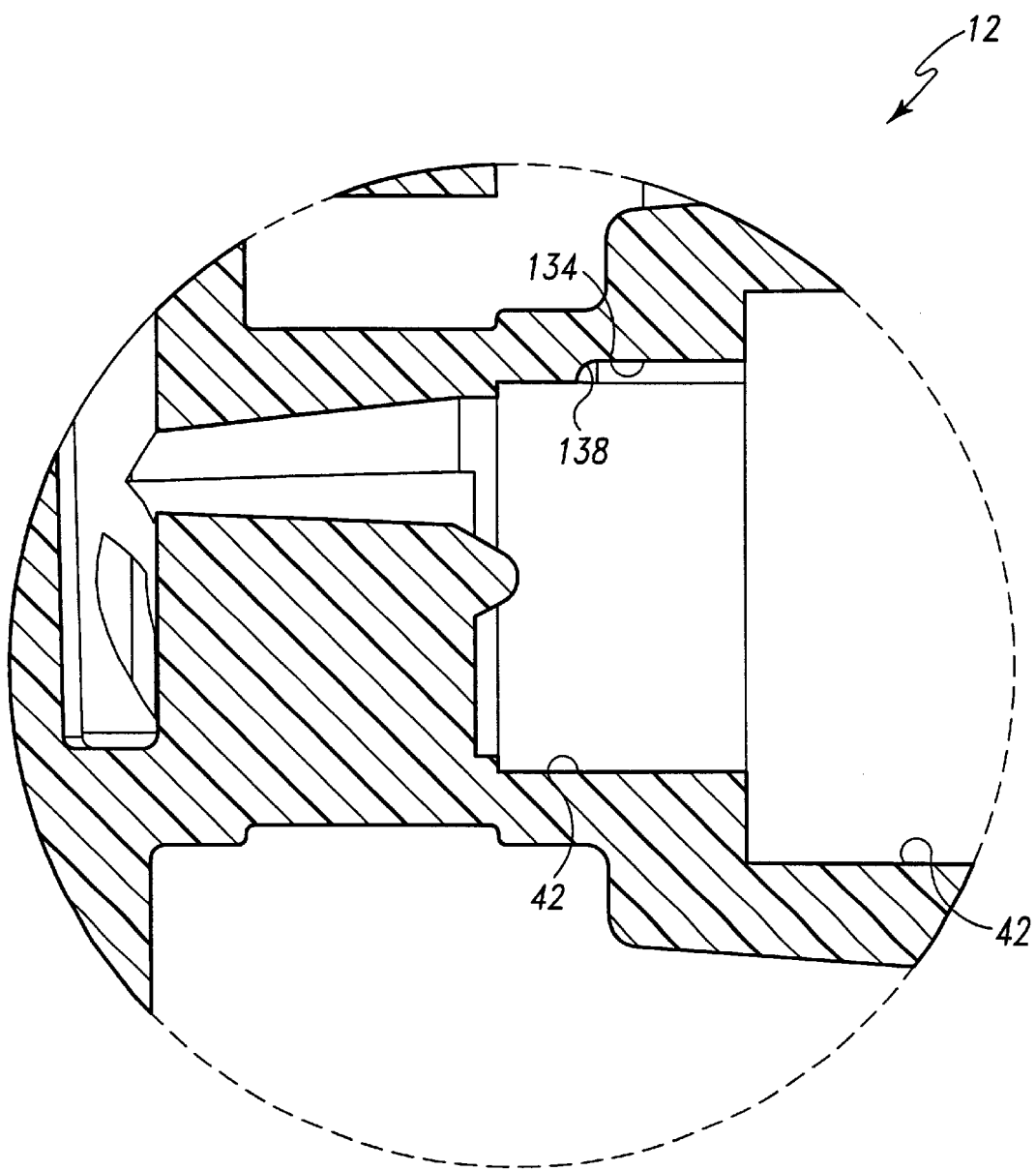
FIG. 7 is an enlarged view of a portion of FIG. 6 which is encircled and indicated as FIG. 7.

As shown in FIGS. 6 and 7, the valve body 12 has a number of bypass channels 134 defined therein. The bypass channels 134 cooperate with the flow control device 50 in order to provide for a bypass flow of water around the periphery of the flow control device 50 at relatively low inlet water pressures. In particular, at relatively low inlet water pressures (e.g., less than 20 psi), a sealing surface 136 defined in the sealing lip 126 of the flow control device 50 is spaced apart from a shoulder 138 of the bypass channels 134 (see FIGS. 7, 8, 9, and 11). This allows water advancing through the central cavity 42 of the valve body 12 to not only advance through the central passage 54 of the flow control device 50, but also advance through the bypass channels 134. It should be appreciated that such a water bypass increases the flow rate of water through the washer orifice 140 and hence through the outlet 16 of the water valve assembly 10 at relatively low inlet water pressures such as 10–20 psi.

However, at higher inlet water pressures (e.g., greater than 20 psi), such a water bypass is not needed. In particular, at water pressures greater than, for example, 20 psi, the flow control device 50 flexes or deforms in response to variations in inlet water pressure exerted on the upstream face 56 thereof. In particular, as the inlet water pressure on the upstream face 56 increases, a greater amount of flexing or deformity of the flow control device 50 occurs thereby reducing the diameter of the central passage 54 and hence the water flow rate therethrough. As the inlet water pressure exerted on the upstream face 56 decreases, the degree of flexing or deformity of the flow control device 50 likewise decreases thereby enlarging, or even maximizing, the diameter of the central passage 54 and hence the water flow rate therethrough. Hence, amongst other things, the size of the central passage 54 and the flexibility and/or deformability of the material utilized in the construction of the flow control device 50 may be specifically selected to produce a flow control device which provides for a specified, relatively constant flow rate.

It should be appreciated that at water pressures within the typical household operative range (i.e. greater than 20 psi), the above-described flexing and deforming of the flow control device 50 is adequate to produce the desired water flow rate without the use of the bypass channels 134. In fact, at certain higher water pressures, an additional flow of water through the bypass channels 134 may increase the water flow rate above the desirable level. The collapsible bypass pads 132 function to prevent such an undesirable bypass water flow at higher water pressures. In particular, once the water pressure exerted on the upstream face 56 exceeds a predetermined magnitude, each of the bypass pads 132 is compressed or otherwise collapsed into one of a number of bypass recesses 142 which are each defined by a portion of the valve body 12 and a portion of the washer 52. Such compression of the bypass pads 132 into the bypass recesses 142 causes the sealing surface 136 defined in the sealing lip 126 of the flow control device 50 to be advanced into sealing engagement with the shoulder 138 of the bypass channels 134 thereby preventing the flow of water through the bypass channels 134. It should be appreciated that the portions of the sealing lip 126 which are not proximate to the bypass channels 134 remain in sealing engagement with the interior valve body walls of the central cavity 42 irrespective of the inlet water pressure.

Therefore, when the portions of the sealing lip 126 proximate to the bypass channels are urged into sealing engagement with the respective shoulders 138 of the bypass channels 134 in the manner described above, the entire periphery of the flow control device 50 is in sealing engagement with the valve body 12 thereby preventing the flow of any water around the periphery of the flow control device 50 such that any water being advanced through the washer orifice 140 of the washer 52 (and hence through the water outlet 16) must first be advanced through the central passage 54 of the flow control device 50. In this manner, the flow rate of water advancing through the flow control device may be maintained relatively constant based on the aforedescribed flexing and deformation of the flow control device 50.

Although the bypass channels 134 are herein described as being defined in the valve body 12, and have significant advantages thereby in the present invention, it should be appreciated that other configurations of the bypass channels 134 are contemplated for use in the present invention. For example, a valve component such as a cup-shaped member having the bypass channels 134 defined therein may be inserted into the central cavity 42 of the valve body 12. At the closed end thereof, the cup-shaped member has an orifice defined therein for allowing water to be advanced out of the central cavity of the cup-shaped member. In such a configuration, the flow control device 50 would be positioned within a central cavity of the cup-shaped member in order to cooperate with the bypass channels 134 in the manner described above. It should be appreciated that such use of a separate valve component (i.e. the cup-shaped member) is particularly useful for retrofitting existing water valve assembly designs which do not include a valve body having bypass channels defined therein.

Operation of the Present Invention

In operation, the water valve assembly 10 may be utilized to provide for a relatively constant water flow rate at varying water inlet pressures. In particular, at relatively low inlet water pressures (e.g., less than 20 psi), the flow control device 50 assumes a low pressure orientation in which the sealing surface 136 defined in the sealing lip 126 of the flow control device 50 is spaced apart from a shoulder 138 of the bypass channels 134 (see FIGS. 7, 8, 9, and 11). This allows the relatively low pressured water advancing through the central cavity 42 of the valve body 12 to not only advance through the central passage 54 of the flow control device 50, but also advance through the bypass channels 134. It should be appreciated that such a water bypass increases the flow rate of water through the washer orifice 140 and hence through the outlet 16 of the water valve assembly 10 at relatively low inlet water pressures such as 10–20 psi.

However, at higher inlet water pressures (e.g., greater than 20 psi), the flow control device 50 is oriented in a high pressure orientation in which the collapsible bypass pads 132 function to prevent an undesirable bypass water flow. In particular, once the water pressure exerted on the upstream face 56 exceeds a predetermined magnitude, each of the bypass pads 132 is compressed or otherwise collapsed into one of the bypass recesses 142. Such compression of the bypass pads 132 into the bypass recesses 142 causes the sealing surface 136 defined in the sealing lip 126 of the flow control device 50 to be advanced into sealing engagement with the shoulder 138 of the bypass channels 134 thereby preventing the bypass flow of water through the bypass channels 134. It should be appreciated that the portions of the sealing lip 126 which are not proximate to the bypass channels 134 remain in sealing engagement with the interior valve body walls of the central cavity 42 irrespective of the inlet water pressure. Therefore, when the portions of the sealing lip 126 proximate to the bypass channels 134 are urged into sealing engagement with the respective shoulders 138 of the bypass channels 134 in the manner described above, the entire periphery of the flow control device 50 is in sealing engagement with the valve body 12 thereby preventing the flow of any water around the periphery of the flow control device 50 such that any water being advanced through the washer orifice 140 of the washer 52 (and hence through the water outlet 16) must first be advanced through the central passage 54 of the flow control device 50.

In this manner, the flow rate of water advancing through the flow control device may be maintained relatively constant based on the flexing and deformation of the flow control device 50. In particular, as the inlet water pressure exerted on the upstream face 56 increases, a greater degree of flexing or deformity of the flow control device 50 occurs thereby reducing the diameter of the central passage 54 and hence the water flow rate therethrough. As the inlet water exerted on the upstream face 56 decreases, the degree of flexing or deformity of the flow control device 50 likewise decreases thereby enlarging, or even maximizing, the diameter of the central passage 54 and hence the water flow rate therethrough.

Hence, from the above description it should be appreciated that the configuration of the flow control device 50 and the valve body 12 may be altered to fit the needs of a given water valve assembly design. In particular, the size, number, and material construction of the bypass pads 132 may be altered to adjust the pressure at which the sealing lip 126 is advanced into sealing engagement with the respective shoulders 138 of the bypass channels 134 in order to prevent water from bypassing the flow control device 50. In particular, by increasing the number or size or the bypass pads 132, or constructing them from relatively rigidly deformable materials, the pressure at which the bypass channels 134 are sealed by the sealing lip 126 may be increased. Alternatively, by decreasing the number or size of the bypass pads 132, or constructing them from a relatively soft deformable material, the pressure at which the bypass channels 134 are sealed by the sealing lip 126 may be decreased.

Moreover, the size and number of the bypass channels 134 may be altered in order to alter the amount of water which is allowed to bypass the flow control device 50. In particular, by increasing the size and number of bypass channels 134, the amount of water which is allowed to bypass the flow control device 50 (when the by pass channels 134 are not sealed by the sealing lip 126) likewise increases. Conversely, by decreasing the size and number of the bypass channels 134, the amount of water which is allowed to bypass the flow control device 50 is likewise decreased.

While the invention has been illustrated and described in detail in the drawings and foregoing description, such an illustration and description is to be considered as exemplary and not restrictive in character, it being understood that only the preferred embodiments have been shown and described and that all changes and modifications that come within the spirit of the invention are desired to be protected.

There are a plurality of advantages of the present invention arising from the various features of the water valve assembly described herein. It will be noted that alternative embodiments of the water valve assembly of the present invention may not include all of the features described yet still benefit from at least some of the advantages of such features. Those of ordinary skill in the art may readily devise their own implementations of a water valve assembly that incorporate one or more of the features of the present invention and fall within the spirit and scope of the present invention as defined by the appended claims.

Figure 12:
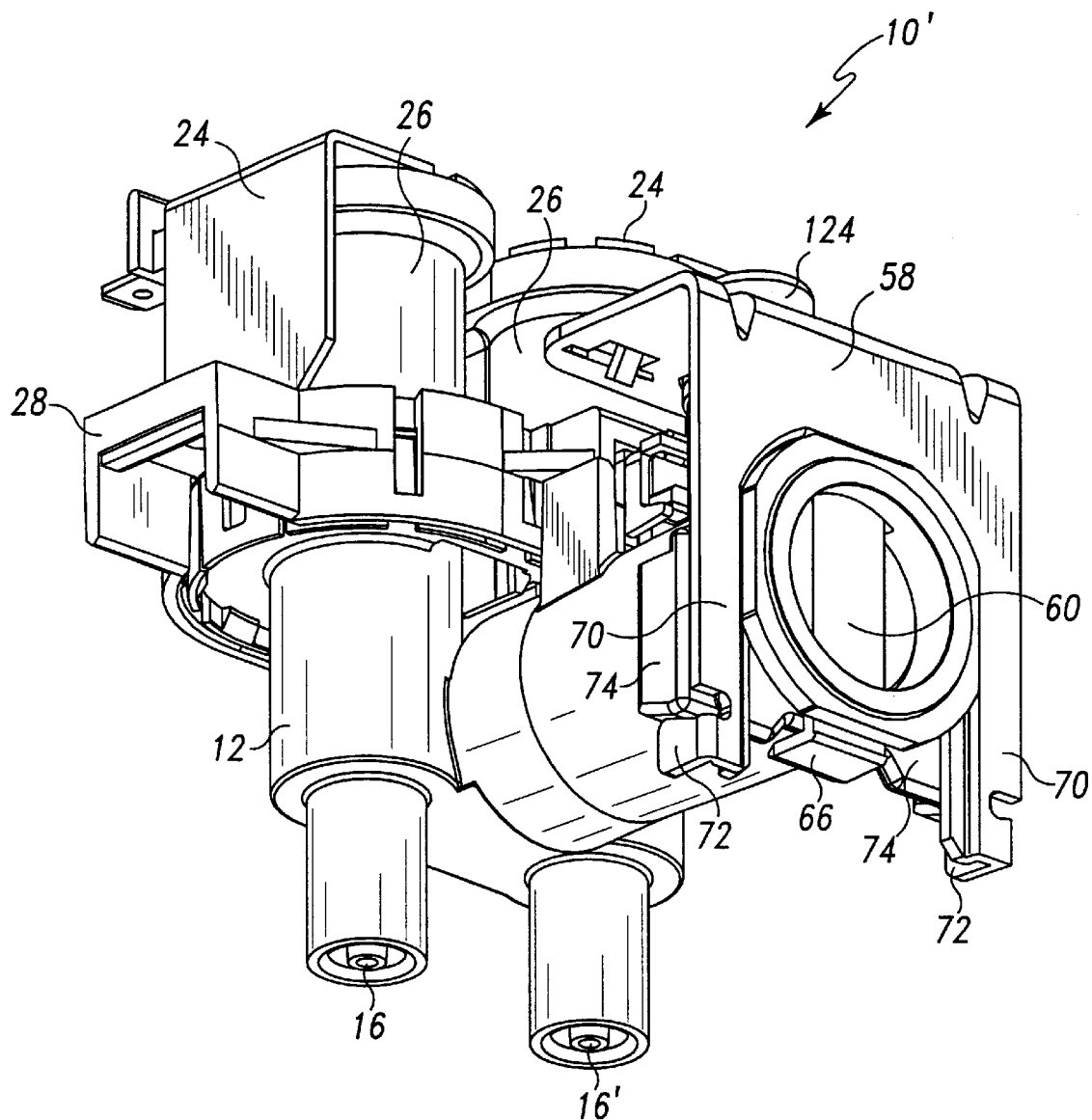
FIG. 12 is a perspective view similar to FIG. 1, but showing a dual outlet water valve assembly which incorporates the features of the present invention therein.

For example, the concepts of the present invention may be utilized in the construction of other types of water valve assemblies. In particular, as shown in FIG. 12, the concepts of the present invention may be utilized in the construction of a water valve assembly 10' which has a pair of water outlets 16 and 16' (as opposed to a single water outlet). Such a valve assembly is particularly useful for supplying water to two separate appliance components such as an icemaker and a door-mounted cold water dispensing unit. Moreover, it should also be appreciated that the concepts of the present invention may also be utilized in the construction of water valve assemblies for use in other types of appliances such as dishwashers and clothes washers or even in the construction of water valve assemblies for non-appliance applications.

As a further example, the water valve assemblies 10, 10' of the present invention may also be constructed to include additional novel valve components. For example, as shown in FIGS. 13–19, the water valve assembly 10 (and also the water valve assembly 10') may be constructed with a single component which performs the function of both the filter screen 46 and the noise suppressor 48 (hereinafter designated with reference numeral 150). Such use of an integrated filter and noise suppressor 150 provides numerous advantages to the water valve assemblies 10, 10'. In particular, by reducing the number of components associated with the valve assemblies 10, 10', manufacture of the valve assemblies is simplified thereby reducing costs associated with the valve assemblies.

The integrated filter and noise suppressor 150 is preferably constructed of a polymeric material such as plastic and includes a component body 152 having a number of screen members 154 and a number of fluid channels 156 defined therein. As shall be discussed in greater detail below, water is first advanced through a number of gaps 158 defined between the screen members 154 so as to remove any particles suspended in the water and thereafter advanced through the fluid channels 156 prior to advancement through the flow control device 50. Such a flow arrangement effectively filters the water flow while also reducing, or even eliminating, cavitation within the flow of water thereby reducing the noise associated with water flow through the valve assembly 10, 10'.

Figure 13:
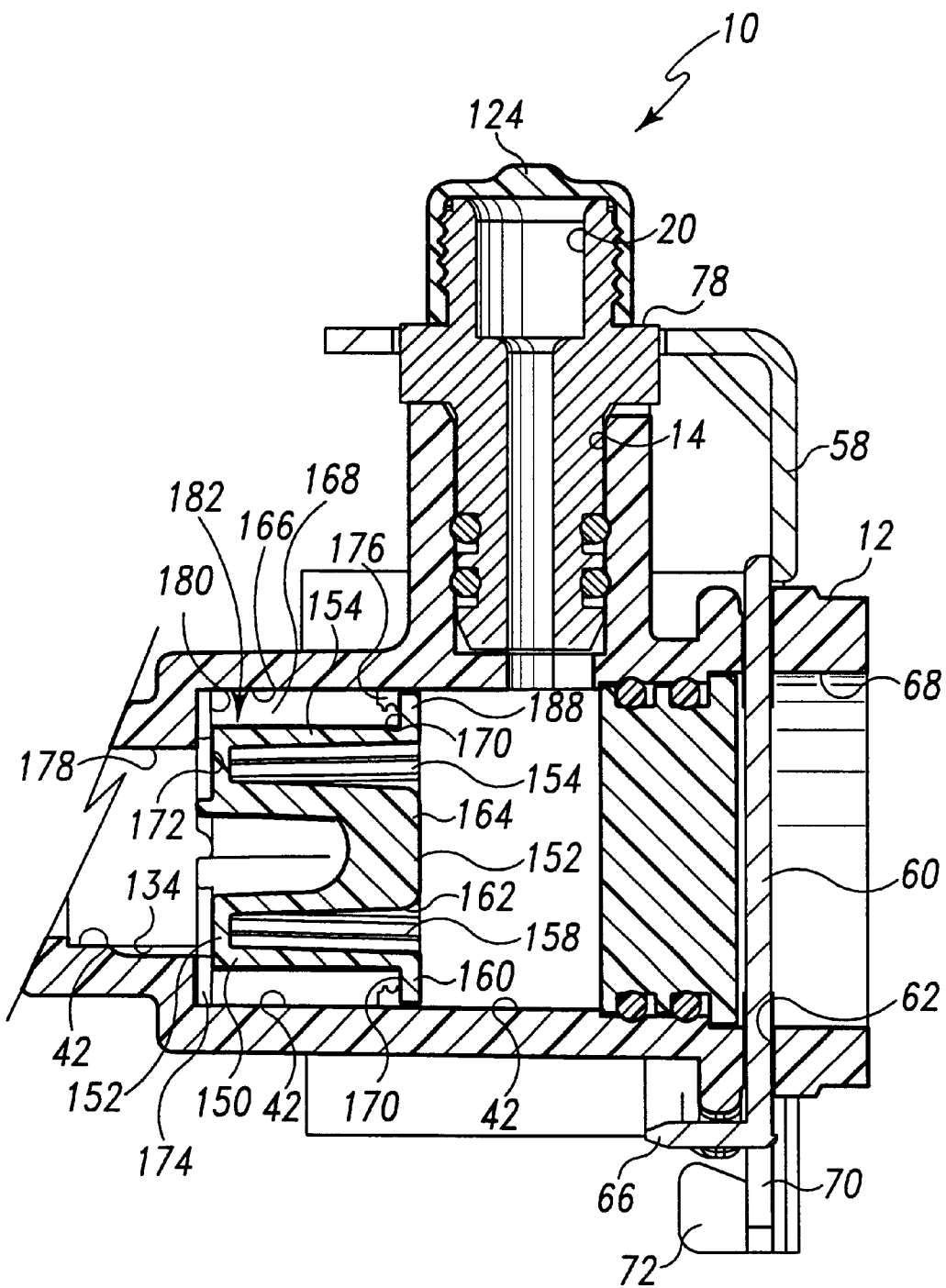
FIG. 13 is a fragmentary cross sectional view similar to FIG. 4, but showing the water valve assembly configured with an integrated filter and noise suppressor (note that the flow control device and the washer have been removed from FIG. 13 for clarity of description)
Figure 14:
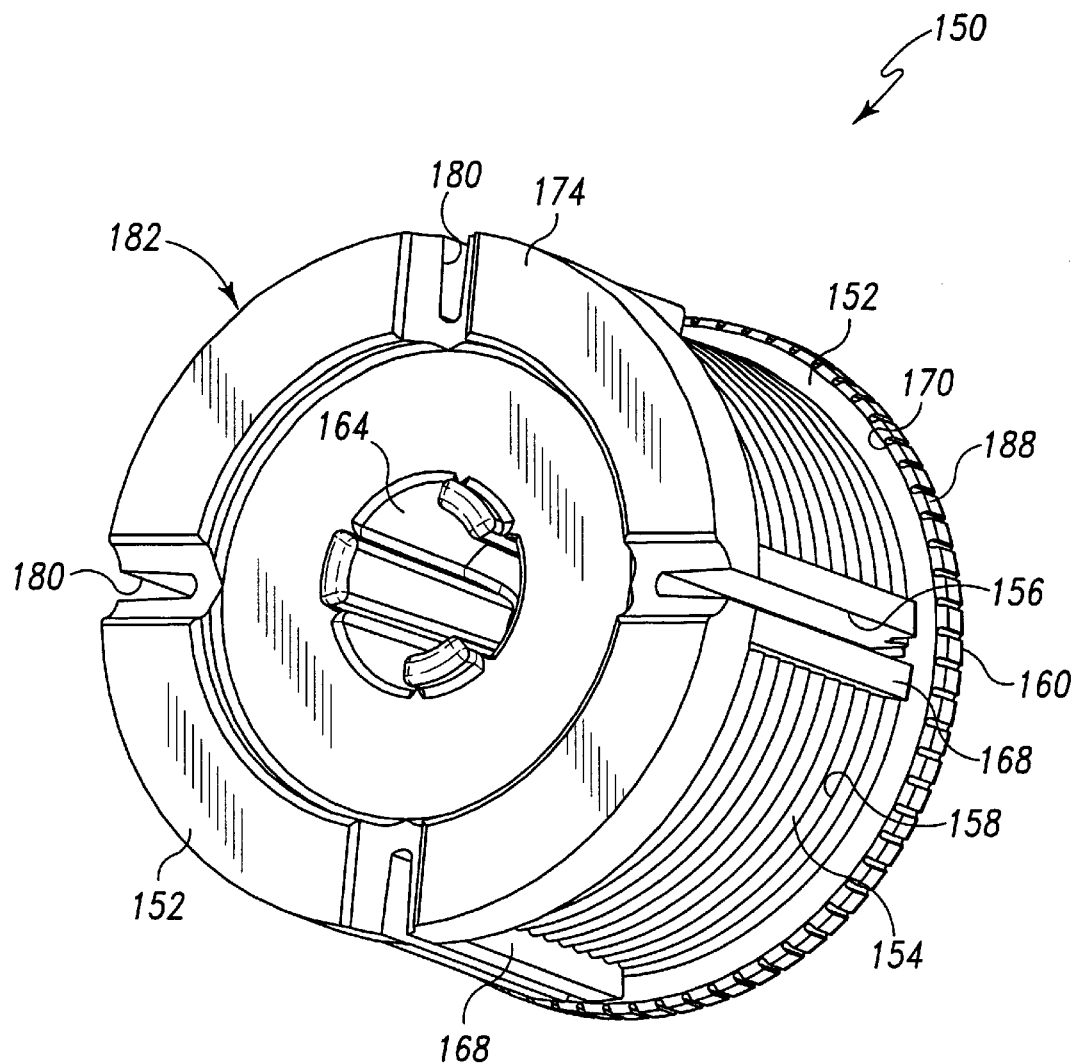
FIGS. 14 and 15 are enlarged perspective views of the integrated filter and noise suppressor of the water valve assembly of FIG. 13.
Figure 15:
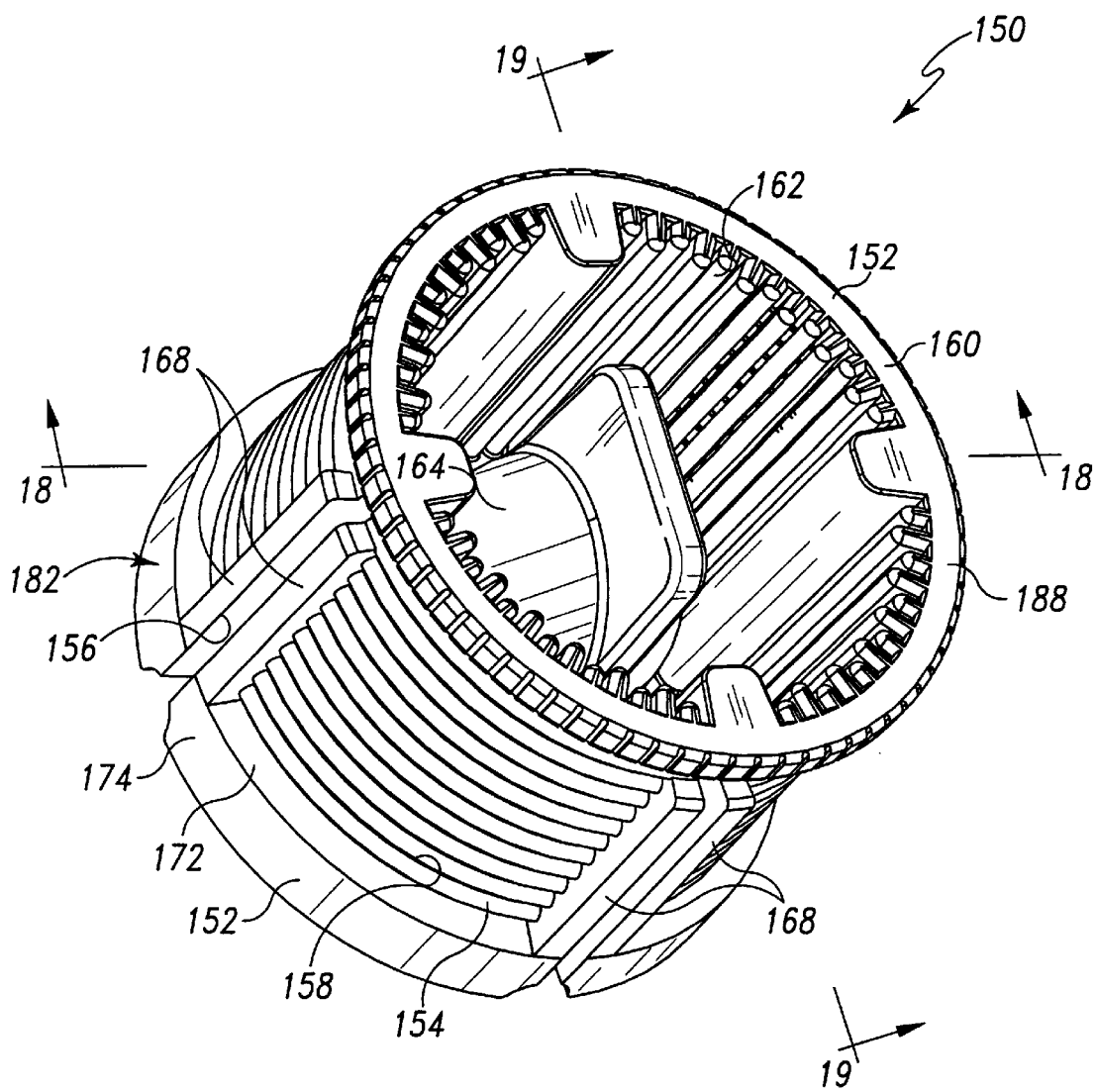
Figure 16:
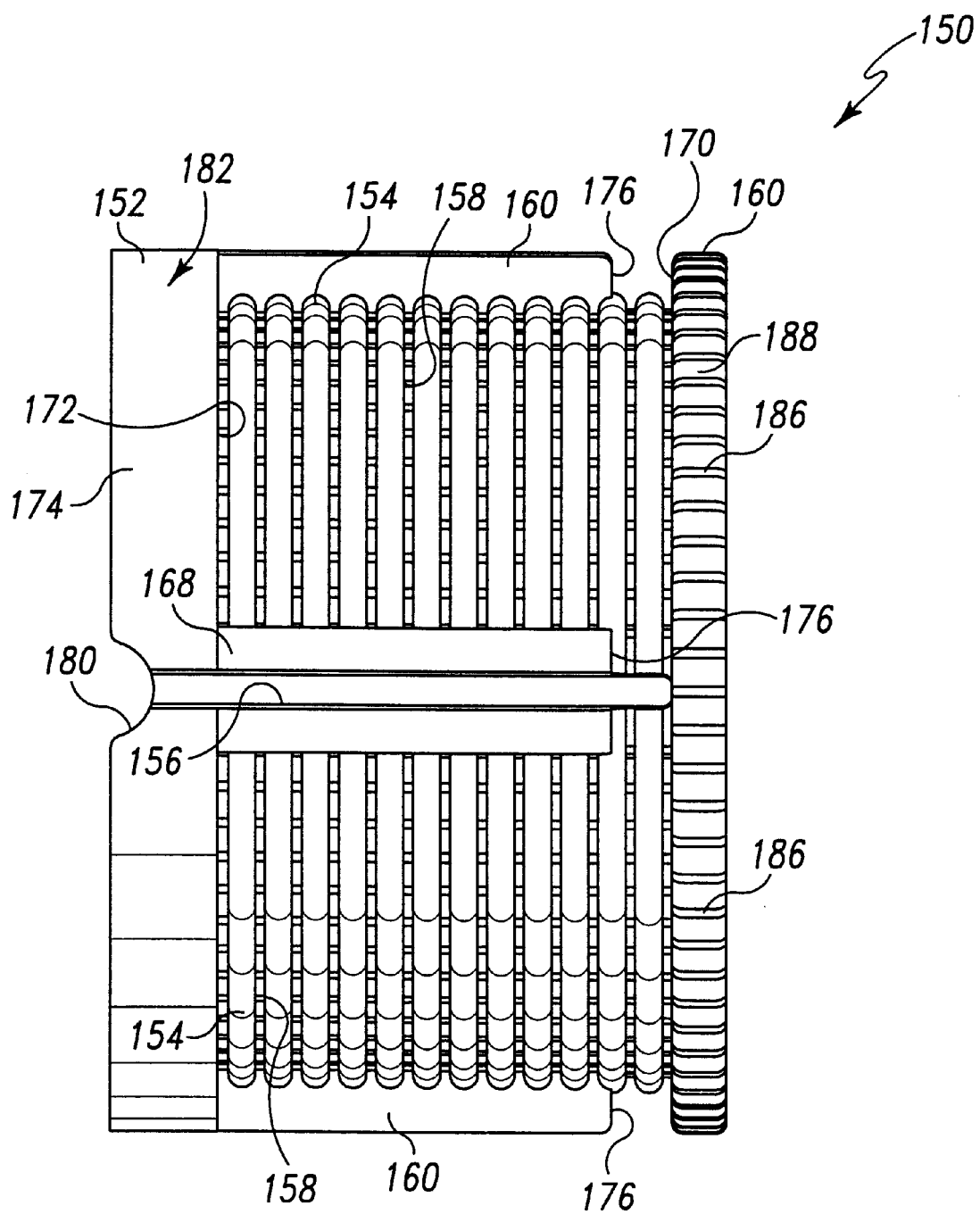
FIG. 16 is a plan view of the integrated filter and noise suppressor of FIGS. 14 and 15.
Figure 17:
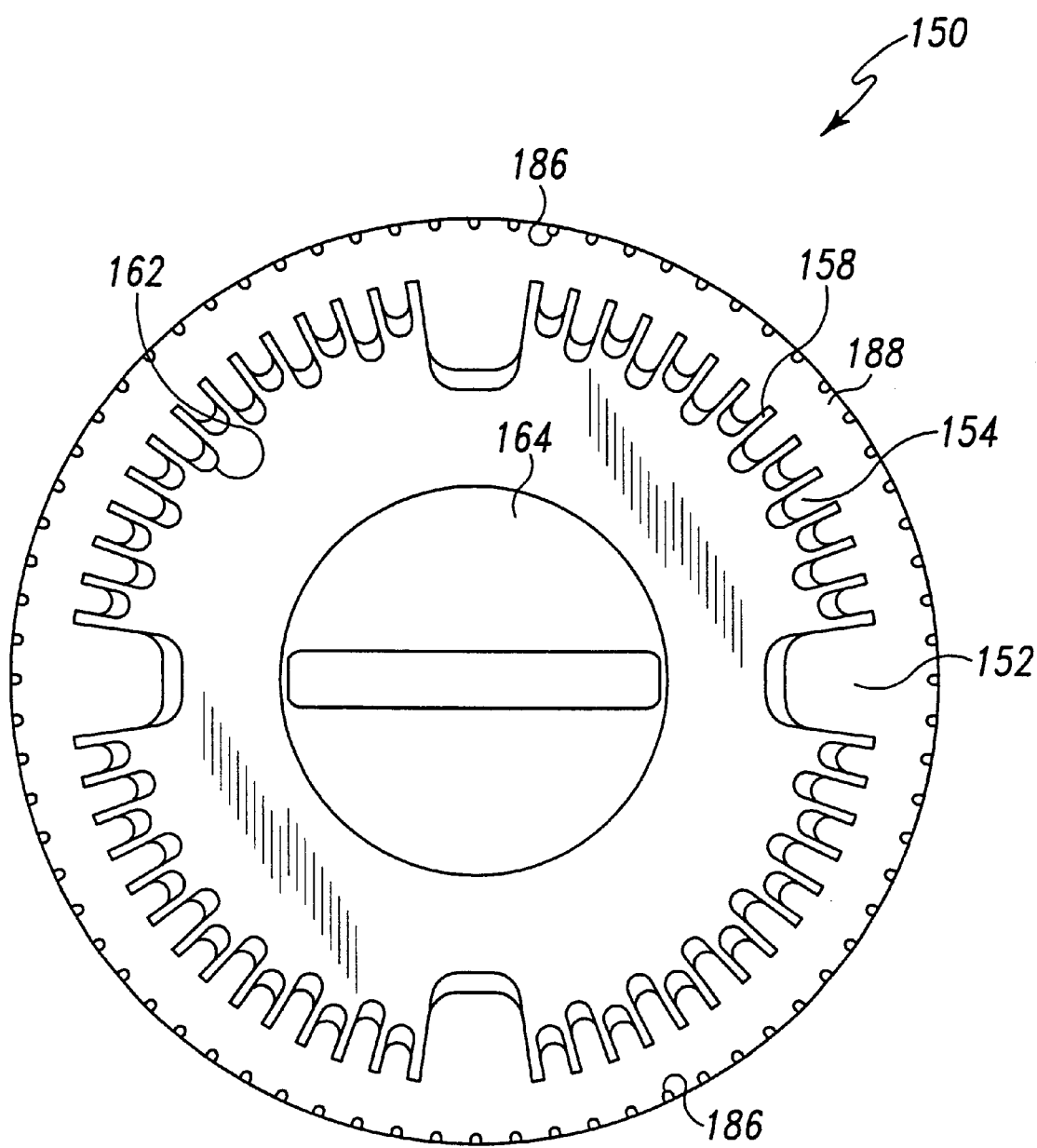
FIG. 17 is an elevational view of the integrated filter and noise suppressor of FIG. 16, as viewed from the upstream side thereof.
Figure 18:
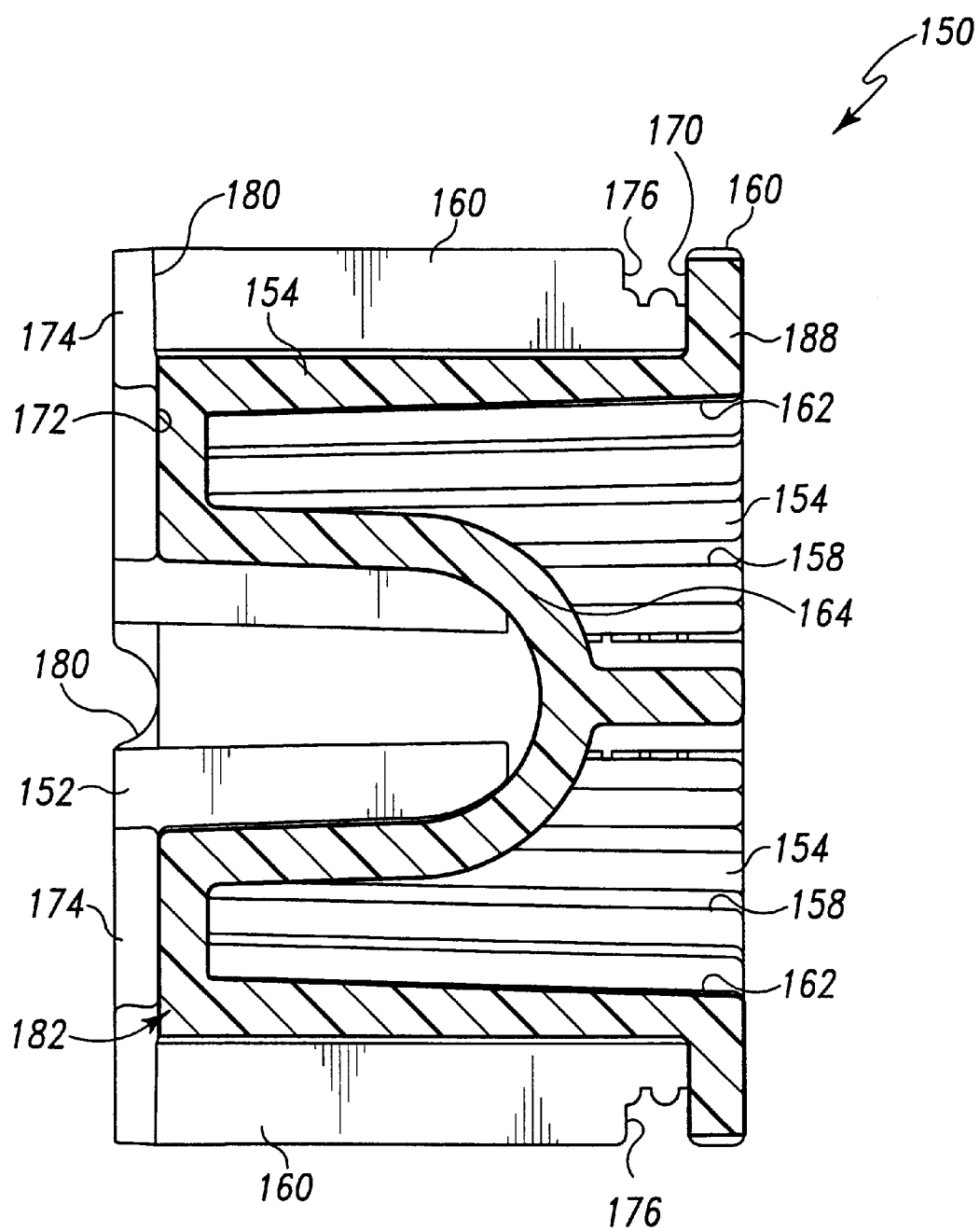
FIG. 18 is a cross sectional view of the integrated filter and noise suppressor taken along the line 8—8 of FIG. 15, as viewed in the direction of the arrows.
Figure 19:
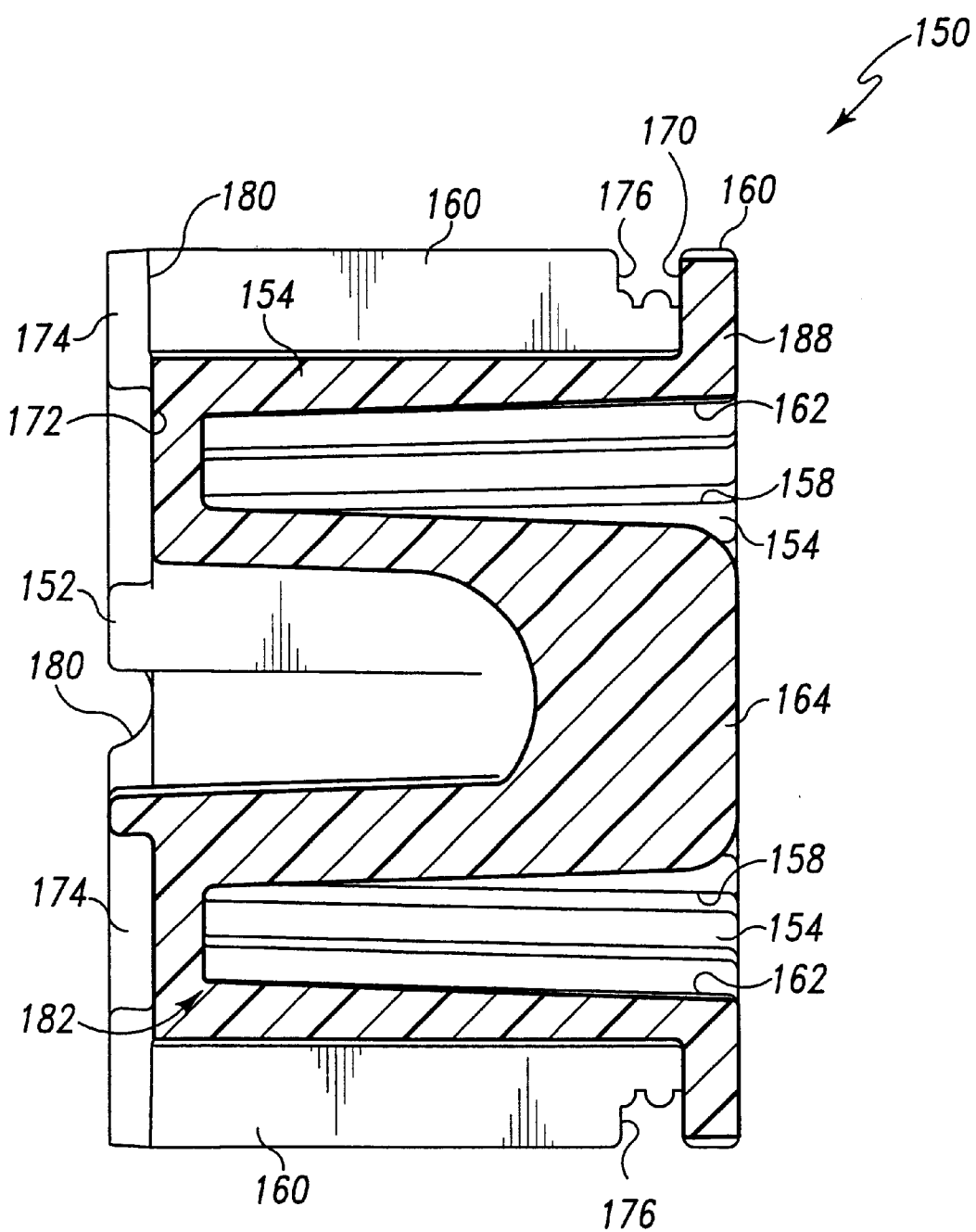
FIG. 19 is a cross sectional view of the integrated filter and noise suppressor taken along the line 19—19 of FIG. 15, as viewed in the direction of the arrows.

As shown in FIG. 13, the component body 152 of the integrated filter and noise suppressor 150 is sealingly engaged with the interior walls of the central cavity 42 of the valve body 12. In particular, a sealing flange 174 defined in the component body 152 around the outer periphery of a downstream end portion 182 of the body 152 (see also FIGS. 14–16, 18, and 19) contacts the interior walls of the central cavity 42 so as to prevent water from being advanced around the periphery of the component body 152. As a result, a large portion of the water advancing through the central cavity 42 of the valve body 12 is advanced into a fluid cavity 162 defined in the component body 152 of the integrated filter and noise suppressor 150 (see FIGS. 15 and 17). Water advancing into the fluid cavity 162 strikes a bullet-shaped fluid diverter 164 which directs the water radially outwardly in all directions.

The outwardly directed flow of water (from the fluid diverter 164) is then advanced through the gaps 158 between the screen members 154 so as to filter the flow of water or otherwise inhibit any debris particles which may be contained in the incoming residential water flow from further advancement through the remaining valve components associated with the water valve assembly 10, 10'. Once advanced through the gaps 158 between the screen members 154, the flow of water accumulates in a number of fluid reservoirs 166 (see FIG. 13) defined by the area between (1) a number of sidewalls 168 of the component body 152 into which the fluid channels 156 are defined (see FIGS. 14 and 15), (2) the outer surface of the screen members 154, (3) a downstream face 170 of the an upstream flange 188 (see FIGS. 13 and 14) defined in the component body 152, (4) an upstream face 172 of the sealing flange 174 (see FIGS. 13, 15, 18, and 19), and (5) the sidewalls of the central cavity 42 of the valve body 12.

It should be appreciated that a relatively small portion of the water flowing through the water valve assemblies 10,10' is advanced directly into the fluid reservoirs 166. In particular, the upstream flange 188 has a number of filtering orifices 186 defined therein (see FIGS. 16 and 17). Water may be advanced directly into the fluid reservoirs 166 through the filtering orifices 188 without first being advanced through the fluid cavity 162 defined in the component body 152.

In any event, water is then allowed to flow from the fluid reservoirs 166, through a number of access openings 176 defined in the sidewalls 168 of the component body 152 (see FIGS. 13, 16, 18, and 19), and into the fluid channels 156. Once into the fluid channels 156, water is advanced therethrough and exited out a number of exit openings 180 (see FIG. 14) and into a portion 178 of the central cavity 42 (see FIG. 13) which houses the flow control device 50 (note that the flow control device 50 has been removed from FIG. 13 for clarity of description).

As described, the configuration of the integrated filter and noise suppressor 150 creates a complex flow path which effectively filters the flow of water while also reducing the incidences of cavitation within the water thereby reducing the noise associated with the flow of water as it advances through the water valve assembly 10,10'.

What is claimed is:

1. A water valve assembly, comprising:
   a valve component having defined therein (i) a central cavity, and (ii) a bypass channel; and
   a flow control device positioned in said central cavity, said flow control device having defined therein (i) a fluid passage, and (ii) a sealing member secured to an outer periphery of said flow control device, wherein (a) said flow control device is positionable between a first pressure orientation and a second pressure orientation based on water pressure in said central cavity of said valve component, (b) said sealing member is adapted to prevent advancement of water through said bypass channel when said flow control device is oriented in said first pressure orientation, and (c) said sealing member is adapted to allow advancement of water through said bypass channel when said flow control device is oriented in said second pressure orientation.

2. The water valve assembly of claim 1, wherein:
   said flow control device is oriented in said first pressure orientation when said water pressure in said central cavity of said valve component is at a first pressure level,
   said flow control device is oriented in said second pressure orientation when said water pressure in said central cavity of said valve component is at a second pressure level, and
   said first pressure level is greater than said second pressure level.

3. The water valve assembly of claim 1, wherein water is advanced through said fluid passage of said flow control device when said flow control device is oriented in both said first pressure orientation and said second pressure orientation.

4. The water valve assembly of claim 1, further comprising a valve body having defined therein (i) a water inlet, and (ii) a water outlet, wherein:
   said flow control device is interposed between said water inlet and said water outlet such that water flows through said fluid passage as water is advanced from said water inlet to said water outlet, and
   said valve component is integrally formed with said valve body such that both said central passage and said bypass channel are defined in said valve body.

5. The water valve assembly of claim 1, further comprising a valve body having defined therein (i) a water inlet, and (ii) a water outlet, wherein:
   said valve component is positioned within said valve body between said water inlet and said water outlet such that water flows through said fluid passage of said flow control device as water is advanced from said water inlet and said water outlet.

6. The water valve assembly of claim 1, wherein:
   said flow control device further has a bypass pad defined therein,
   said bypass pad being positionable in a compressed position and an uncompressed position,
   said bypass pad is positioned in said compressed position when said flow control device is oriented in said first pressure orientation, and
   said bypass pad is positioned in said uncompressed position when said flow control device is oriented in said second pressure orientation.

7. The water valve assembly of claim 6, further comprising a support washer positioned adjacent to said flow control device, wherein:
   said valve component and said support washer cooperated so as to define a pad recess, and
   said bypass pad is compressed into said pad recess when said bypass pad is positioned in said compressed position.

8. The water valve assembly of claim 1, wherein said flow control device is substantially disk shaped.

9. A method of operating a water valve assembly which includes (i) a valve component having defined therein (a) a central cavity, and (b) a bypass channel, and (ii) a flow control device positioned in said central cavity, with said flow control device having defined therein (a) a fluid passage, and (b) a sealing member secured to an outer periphery of said flow control device, said method comprising the steps of:
   advancing water through said central cavity of said valve component at a first water pressure level;
   orienting said flow control device in a first pressure orientation such that said sealing member prevents advancement of water through said bypass channel in response to advancement of water through said central cavity of said valve component at said first water pressure level;
   advancing water through said central cavity of said valve component at a second water pressure level; and
   orienting said flow control device in a second pressure orientation such that said sealing member allows advancement of water through said bypass channel in response to advancement of water through said central cavity of said valve component at said second water pressure level.

10. The method of claim 9, wherein said first water pressure level is greater than said second water pressure level.

11. The method of claim 9, wherein both said step of advancing water through said central cavity of said valve component at said first water pressure level and said step of advancing water through said central cavity of said valve component at said second water pressure level include the step of advancing water through said fluid passage of said flow control device.

12. The method of claim 9, wherein:
   said water valve further has a valve body having defined therein (i) a water inlet, and (ii) a water outlet,
   said flow control device is interposed between said water inlet and said water outlet,
   said valve component is integrally formed with said valve body such that both said central passage and said bypass channel are defined in said valve body, and
   both said step of advancing water through said central cavity of said valve component at said first water pressure level and said step of advancing water through said central cavity of said valve component at said second water pressure level include the step of advancing water through said fluid passage of said flow control device as water is advanced from said water inlet to said water outlet.

13. The method of claim 9, wherein:

said water valve further has a valve body having defined therein (i) a water inlet, and (ii) a water outlet, said valve component is positioned within said valve body at a location between said water inlet and said water outlet such that both said step of advancing water through said central cavity of said valve component at said first water pressure level and said step of advancing water through said central cavity of said valve component at said second water pressure level include the step of advancing water through said fluid passage of said flow control device as water is advanced from said water inlet to said water outlet.

14. The method of claim 9, wherein:

said flow control device further has a bypass pad defined therein, said bypass pad being positionable in a compressed position and an uncompressed position, said step of orienting said flow control device in said first pressure orientation includes the step of positioning said bypass pad in said compressed position, and said step of orienting said flow control device in said second pressure orientation includes the step of positioning said bypass pad in said uncompressed position.

15. The method of claim 14, wherein:

said valve assembly further has a support washer positioned adjacent to said flow control device, said valve component and said support washer cooperated so as to define a pad recess, and said step of positioning said bypass pad in said compressed position includes the step of compressing said bypass pad into said pad recess.

\* \* \* \* \*